(12) United States Patent
Alizadeh-Shabdiz

(10) Patent No.: US 8,638,725 B2
(45) Date of Patent: *Jan. 28, 2014

(54) METHODS AND SYSTEMS FOR DETERMINING LOCATION USING A CELLULAR AND WLAN POSITIONING SYSTEM BY SELECTING THE BEST WLAN PS SOLUTION

(71) Applicant: Skyhook Wireless, Inc., Boston, MA (US)

(72) Inventor: Farshid Alizadeh-Shabdiz, Wayland, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,850

(22) Filed: Jun. 11, 2013

(65) Prior Publication Data

US 2013/0288708 A1 Oct. 31, 2013

Related U.S. Application Data

(63) Continuation of application No. 12/485,588, filed on Jun. 16, 2009, now Pat. No. 8,462,745.

(60) Provisional application No. 61/061,853, filed on Jun. 16, 2008.

(51) Int. Cl.
*H04W 4/00* (2009.01)
*H04W 24/00* (2009.01)

(52) U.S. Cl.
USPC .......................... 370/328; 370/338; 455/456.1

(58) Field of Classification Search
None
See application file for complete search history.

(56) References Cited

U.S. PATENT DOCUMENTS

| 3,881,060 A | 4/1975 | Connell et al. |
| 4,310,726 A | 1/1982 | Asmuth |
| 4,402,049 A | 8/1983 | Gray |

(Continued)

FOREIGN PATENT DOCUMENTS

| CA | 2056203 A1 | 7/1992 |
| EP | 0493896 A2 | 7/1992 |

(Continued)

OTHER PUBLICATIONS

"A Practical Approach to Identifying and Tracking Unauthorized 802.11 Cards and Access Points," Interlink Networks, 2002, 20 pages.

(Continued)

*Primary Examiner* — Marcus R Smith
(74) *Attorney, Agent, or Firm* — Wilmer Cutler Pickering Hale and Dorr LLP

(57) ABSTRACT

The disclosed subject matter relates to a method and system for increasing the accuracy of a WLAN based position estimate using cellular positioning information. In some embodiments, the method can include determining a set of possible WLAN location solutions for a WLAN and cellular enabled device based on one or more WLAN access points, obtaining cellular measurements from at least one cell tower, and determining the best WLAN location solution from the set of possible WLAN location solutions using the cellular measurements. In one embodiment, the method can include using the cellular measurements from the at least one cell tower to provide a cellular based location estimate for the WLAN and cellular enabled device.

20 Claims, 11 Drawing Sheets

(56) References Cited

U.S. PATENT DOCUMENTS

| | | |
|---|---|---|
| 4,415,771 A | 11/1983 | Martinez |
| 4,445,118 A | 4/1984 | Taylor et al. |
| 4,459,667 A | 7/1984 | Takeuchi |
| 4,757,267 A | 7/1988 | Riskin |
| 4,806,940 A | 2/1989 | Harral et al. |
| 4,814,711 A | 3/1989 | Olsen et al. |
| 4,818,998 A | 4/1989 | Apsell et al. |
| 4,876,550 A | 10/1989 | Kelly |
| 4,891,650 A | 1/1990 | Sheffer |
| 4,903,212 A | 2/1990 | Yokouchi et al. |
| 4,908,629 A | 3/1990 | Apsell et al. |
| 4,924,491 A | 5/1990 | Compton et al. |
| 5,022,751 A | 6/1991 | Howard |
| 5,043,736 A | 8/1991 | Darnell et al. |
| 5,095,505 A | 3/1992 | Finucane et al. |
| 5,119,101 A | 6/1992 | Barnard |
| 5,119,504 A | 6/1992 | Durboraw, III |
| 5,136,636 A | 8/1992 | Wegrzynowicz |
| 5,155,689 A | 10/1992 | Wortham |
| 5,161,180 A | 11/1992 | Chavous |
| 5,202,829 A | 4/1993 | Geier |
| 5,235,630 A | 8/1993 | Moody et al. |
| 5,235,633 A | 8/1993 | Dennison et al. |
| 5,257,195 A | 10/1993 | Hirata |
| 5,276,451 A | 1/1994 | Odagawa |
| 5,293,318 A | 3/1994 | Fukushima |
| 5,295,180 A | 3/1994 | Vendetti et al. |
| 5,315,636 A | 5/1994 | Patel |
| 5,327,144 A | 7/1994 | Stilp et al. |
| 5,334,974 A | 8/1994 | Simms et al. |
| 5,353,023 A | 10/1994 | Mitsugi |
| 5,365,447 A | 11/1994 | Dennis |
| 5,365,450 A | 11/1994 | Schuchman et al. |
| 5,374,933 A | 12/1994 | Kao |
| 5,379,337 A | 1/1995 | Castillo et al. |
| 5,388,147 A | 2/1995 | Grimes |
| 5,389,935 A | 2/1995 | Drouault et al. |
| 5,412,388 A | 5/1995 | Attwood |
| 5,414,432 A | 5/1995 | Penny, Jr. et al. |
| 5,420,592 A | 5/1995 | Johnson |
| 5,420,594 A | 5/1995 | FitzGerald et al. |
| 5,422,813 A | 6/1995 | Schuchman et al. |
| 5,423,067 A | 6/1995 | Manabe |
| 5,425,136 A | 6/1995 | Lo et al. |
| 5,428,546 A | 6/1995 | Shah et al. |
| 5,430,654 A | 7/1995 | Kyrtsos et al. |
| 5,434,950 A | 7/1995 | Kaallman |
| 5,438,517 A | 8/1995 | Sennott et al. |
| 5,442,349 A | 8/1995 | Inoue et al. |
| 5,452,211 A | 9/1995 | Kyrtsos et al. |
| 5,479,482 A | 12/1995 | Grimes |
| 5,488,559 A | 1/1996 | Seymour |
| 5,490,073 A | 2/1996 | Kyrtsos |
| 5,510,798 A | 4/1996 | Bauer |
| 5,510,801 A | 4/1996 | Engelbrecht et al. |
| 5,512,903 A | 4/1996 | Schmidtke |
| 5,517,419 A | 5/1996 | Lanckton et al. |
| 5,519,760 A | 5/1996 | Borkowski et al. |
| 5,546,092 A | 8/1996 | Kurokawa et al. |
| 5,552,772 A | 9/1996 | Janky et al. |
| 5,561,704 A | 10/1996 | Salimando |
| 5,564,079 A | 10/1996 | Olsson |
| 5,564,121 A | 10/1996 | Chow et al. |
| 5,565,858 A | 10/1996 | Guthrie |
| 5,570,412 A | 10/1996 | LeBlanc |
| 5,596,332 A | 1/1997 | Coles et al. |
| 5,602,903 A | 2/1997 | LeBlanc et al. |
| 5,604,765 A | 2/1997 | Bruno et al. |
| 5,612,864 A | 3/1997 | Henderson |
| 5,627,549 A | 5/1997 | Park |
| 5,646,630 A | 7/1997 | Sheynblat et al. |
| 5,646,857 A | 7/1997 | McBurney et al. |
| 5,657,025 A | 8/1997 | Ebner et al. |
| 5,686,924 A | 11/1997 | Trimble et al. |
| 5,689,270 A | 11/1997 | Kelley et al. |
| 5,717,737 A | 2/1998 | Doviak et al. |
| 5,724,660 A | 3/1998 | Kauser et al. |
| 5,740,049 A | 4/1998 | Kaise |
| 5,774,829 A | 6/1998 | Cisneros et al. |
| 5,841,396 A | 11/1998 | Krasner |
| 5,872,539 A | 2/1999 | Mullen |
| 5,902,351 A | 5/1999 | Streit et al. |
| 5,922,040 A | 7/1999 | Prabhakaran |
| 5,923,286 A | 7/1999 | Divakaruni |
| 5,929,806 A | 7/1999 | Birchler et al. |
| 5,936,572 A | 8/1999 | Loomis et al. |
| 5,940,825 A | 8/1999 | Castelli et al. |
| 5,943,606 A | 8/1999 | Kremm et al. |
| 5,945,944 A | 8/1999 | Krasner |
| 5,959,580 A | 9/1999 | Maloney et al. |
| 5,969,674 A | 10/1999 | von der Embse et al. |
| 5,999,124 A | 12/1999 | Sheynblat |
| 5,999,126 A | 12/1999 | Ito |
| 6,026,304 A | 2/2000 | Hilsenrath et al. |
| 6,128,501 A | 10/2000 | Ffoulkes-Jones |
| 6,134,448 A | 10/2000 | Shoji et al. |
| 6,185,427 B1 | 2/2001 | Krasner et al. |
| 6,192,312 B1 | 2/2001 | Hummelsheim |
| 6,208,290 B1 | 3/2001 | Krasner |
| 6,236,365 B1 | 5/2001 | LeBlanc et al. |
| 6,272,405 B1 | 8/2001 | Kubota et al. |
| 6,324,404 B1 | 11/2001 | Dennison et al. |
| 6,420,999 B1 | 7/2002 | Vayanos |
| 6,484,034 B1 | 11/2002 | Tsunehara et al. |
| 6,487,500 B2 | 11/2002 | Lemelson et al. |
| 6,574,557 B2 | 6/2003 | Endo |
| 6,587,692 B1 | 7/2003 | Chen et al. |
| 6,664,925 B1 | 12/2003 | Moore et al. |
| 6,674,403 B2 | 1/2004 | Gray et al. |
| 6,678,611 B2 | 1/2004 | Khavakh et al. |
| 6,707,422 B2 | 3/2004 | Sheynblat et al. |
| 6,725,158 B1 | 4/2004 | Sullivan et al. |
| 6,748,226 B1 | 6/2004 | Wortham |
| 6,754,488 B1 | 6/2004 | Won et al. |
| 6,771,211 B2 | 8/2004 | Syrjarinne et al. |
| 6,799,049 B1 | 9/2004 | Zellner et al. |
| 6,862,524 B1 | 3/2005 | Nagda et al. |
| 6,888,811 B2 | 5/2005 | Eaton et al. |
| 6,894,645 B1 | 5/2005 | Akopian et al. |
| 6,928,292 B2 | 8/2005 | Tsunehara et al. |
| 6,975,266 B2 | 12/2005 | Abraham et al. |
| 6,978,023 B2 | 12/2005 | Dacosta |
| 6,990,351 B2 | 1/2006 | Tsunehara et al. |
| 6,990,428 B1 | 1/2006 | Kaiser et al. |
| 6,999,779 B1 | 2/2006 | Hashimoto |
| 7,086,089 B2 | 8/2006 | Hrastar et al. |
| 7,116,988 B2 | 10/2006 | Dietrich et al. |
| 7,120,449 B1 | 10/2006 | Muhonen et al. |
| 7,123,928 B2 | 10/2006 | Moeglein et al. |
| 7,130,642 B2 | 10/2006 | Lin |
| 7,130,646 B2 | 10/2006 | Wang |
| 7,151,939 B2 | 12/2006 | Sheynblat |
| 7,155,239 B2 | 12/2006 | Zeng et al. |
| 7,167,553 B2 | 1/2007 | Shaffer et al. |
| 7,221,928 B2 | 5/2007 | Laird et al. |
| 7,236,126 B2 | 6/2007 | Jeon et al. |
| 7,242,950 B2 | 7/2007 | Suryanarayana et al. |
| 7,250,907 B2 | 7/2007 | Krumm et al. |
| 7,254,405 B2 | 8/2007 | Lin et al. |
| 7,257,411 B2 | 8/2007 | Gwon et al. |
| 7,277,404 B2 | 10/2007 | Tanzella et al. |
| 7,299,058 B2 | 11/2007 | Ogino |
| 7,305,245 B2 | 12/2007 | Alizadeh-Shabdiz et al. |
| 7,313,402 B1 | 12/2007 | Rahman |
| 7,319,878 B2 | 1/2008 | Sheynblat et al. |
| 7,373,154 B2 | 5/2008 | Sharony et al. |
| 7,389,114 B2 | 6/2008 | Ju et al. |
| 7,397,424 B2 | 7/2008 | Houri |
| 7,403,762 B2 | 7/2008 | Morgan et al. |
| 7,412,246 B2 | 8/2008 | Lewis et al. |
| 7,414,988 B2 | 8/2008 | Jones et al. |
| 7,426,197 B2 | 9/2008 | Schotten et al. |
| 7,433,694 B2 | 10/2008 | Morgan et al. |
| 7,433,696 B2 | 10/2008 | Dietrich et al. |

(56) References Cited

U.S. PATENT DOCUMENTS

| | | |
|---|---|---|
| 7,440,755 B2 | 10/2008 | Balachandran et al. |
| 7,471,954 B2 | 12/2008 | Brachet et al. |
| 7,474,897 B2 | 1/2009 | Morgan et al. |
| 7,479,922 B2 | 1/2009 | Hunt et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,519,372 B2 | 4/2009 | MacDonald et al. |
| 7,522,908 B2 | 4/2009 | Hrastar |
| 7,525,484 B2 | 4/2009 | Dupray et al. |
| 7,545,894 B2 | 6/2009 | Ziedan et al. |
| 7,551,579 B2 | 6/2009 | Alizadeh-Shabdiz et al. |
| 7,551,929 B2 | 6/2009 | Alizadeh-Shabdiz et al. |
| 7,587,081 B2 | 9/2009 | Rovira-Mas et al. |
| 7,595,754 B2 | 9/2009 | Mehta |
| 7,660,588 B2 | 2/2010 | Sheynblat et al. |
| 7,664,511 B2 | 2/2010 | Wang et al. |
| 7,672,675 B2 | 3/2010 | Pande et al. |
| 7,683,835 B2 | 3/2010 | Sharma |
| 7,724,612 B2 | 5/2010 | Azim |
| 7,764,231 B1 | 7/2010 | Karr et al. |
| 7,822,427 B1 | 10/2010 | Hou |
| 7,848,733 B2 | 12/2010 | Bull et al. |
| 7,853,250 B2 | 12/2010 | Harvey et al. |
| 7,856,209 B1 | 12/2010 | Rawat |
| 7,863,835 B2 | 1/2011 | Lin et al. |
| 8,130,148 B2 | 3/2012 | Alizadeh-Shabdiz |
| 8,154,454 B2 | 4/2012 | Alizadeh-Shabdiz |
| 8,223,074 B2 | 7/2012 | Alizadeh-Shabdiz |
| 8,242,960 B2 | 8/2012 | Alizadeh-Shabdiz |
| 2003/0011511 A1 | 1/2003 | King et al. |
| 2003/0043073 A1 | 3/2003 | Gray et al. |
| 2003/0125045 A1 | 7/2003 | Riley et al. |
| 2003/0146835 A1 | 8/2003 | Carter |
| 2003/0186679 A1 | 10/2003 | Challener et al. |
| 2003/0197645 A1 | 10/2003 | Ninomiya et al. |
| 2003/0225893 A1 | 12/2003 | Roese et al. |
| 2004/0019679 A1 | 1/2004 | E et al. |
| 2004/0023669 A1 | 2/2004 | Reddy |
| 2004/0039520 A1 | 2/2004 | Khavakh et al. |
| 2004/0048640 A1 | 3/2004 | Bae |
| 2004/0072577 A1 | 4/2004 | Myllymaki et al. |
| 2004/0087317 A1 | 5/2004 | Caci |
| 2004/0124977 A1 | 7/2004 | Biffar |
| 2004/0160909 A1 | 8/2004 | Sheynblat |
| 2004/0205234 A1 | 10/2004 | Barrack et al. |
| 2005/0017898 A1 | 1/2005 | Teranishi |
| 2005/0020266 A1 | 1/2005 | Backes et al. |
| 2005/0037775 A1 | 2/2005 | Moeglein et al. |
| 2005/0090266 A1 | 4/2005 | Sheynblat |
| 2005/0105600 A1 | 5/2005 | Culum et al. |
| 2005/0108306 A1 | 5/2005 | Martizano Catalasan |
| 2005/0164710 A1 | 7/2005 | Beuck |
| 2005/0192024 A1 | 9/2005 | Sheynblat |
| 2005/0227711 A1 | 10/2005 | Orwant et al. |
| 2005/0237967 A1 | 10/2005 | Lee et al. |
| 2005/0285783 A1 | 12/2005 | Harper |
| 2006/0009235 A1 | 1/2006 | Sheynblat et al. |
| 2006/0046709 A1 | 3/2006 | Krumm et al. |
| 2006/0049982 A1 | 3/2006 | Wells |
| 2006/0063560 A1 | 3/2006 | Herle |
| 2006/0089157 A1 | 4/2006 | Casey et al. |
| 2006/0089160 A1 | 4/2006 | Othmer |
| 2006/0095349 A1 | 5/2006 | Morgan et al. |
| 2006/0170591 A1 | 8/2006 | Houri |
| 2006/0193258 A1 | 8/2006 | Ballai |
| 2006/0194568 A1 | 8/2006 | Sharony |
| 2006/0197704 A1 | 9/2006 | Luzzatto et al. |
| 2007/0004427 A1 | 1/2007 | Morgan et al. |
| 2007/0004428 A1 | 1/2007 | Morgan et al. |
| 2007/0052583 A1 | 3/2007 | Zhodzishsky et al. |
| 2007/0077945 A1* | 4/2007 | Sheynblat ............ 455/456.5 |
| 2007/0109184 A1 | 5/2007 | Shyr et al. |
| 2007/0121560 A1 | 5/2007 | Edge |
| 2007/0126635 A1 | 6/2007 | Houri |
| 2007/0150516 A1 | 6/2007 | Morgan et al. |
| 2007/0167174 A1 | 7/2007 | Halcrow et al. |
| 2007/0216540 A1 | 9/2007 | Riley et al. |
| 2007/0217374 A1 | 9/2007 | Waxman |
| 2007/0244631 A1 | 10/2007 | Jung et al. |
| 2007/0258420 A1 | 11/2007 | Alizadeh-Shabdiz et al. |
| 2007/0259624 A1 | 11/2007 | Alizadeh-Shabdiz et al. |
| 2007/0268177 A1 | 11/2007 | Ahmed et al. |
| 2007/0286213 A1 | 12/2007 | Fodor et al. |
| 2007/0297358 A1 | 12/2007 | Chang et al. |
| 2007/0298761 A1 | 12/2007 | Bani Hani |
| 2008/0004037 A1 | 1/2008 | Achlioptas et al. |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2008/0032706 A1 | 2/2008 | Sheynblat et al. |
| 2008/0033646 A1 | 2/2008 | Morgan et al. |
| 2008/0079633 A1 | 4/2008 | Pon et al. |
| 2008/0108371 A1 | 5/2008 | Alizadeh-Shabdiz et al. |
| 2008/0111737 A1 | 5/2008 | Haverkamp et al. |
| 2008/0132170 A1 | 6/2008 | Alizadeh-Shabdiz et al. |
| 2008/0137626 A1 | 6/2008 | Choi et al. |
| 2008/0139217 A1 | 6/2008 | Alizadeh-Shabdiz et al. |
| 2008/0158053 A1 | 7/2008 | Watanabe |
| 2008/0176583 A1 | 7/2008 | Brachet et al. |
| 2008/0214192 A1 | 9/2008 | Soliman |
| 2008/0234533 A1 | 9/2008 | Vollum |
| 2008/0248741 A1 | 10/2008 | Alizadeh-Shabdiz |
| 2008/0248808 A1 | 10/2008 | Alizadeh-Shabdiz |
| 2008/0248809 A1 | 10/2008 | Gower |
| 2008/0261615 A1 | 10/2008 | Kalhan |
| 2009/0002237 A1 | 1/2009 | Nonoyama |
| 2009/0017841 A1 | 1/2009 | Lewis et al. |
| 2009/0042557 A1 | 2/2009 | Vardi et al. |
| 2009/0061892 A1 | 3/2009 | Lee et al. |
| 2009/0075672 A1 | 3/2009 | Jones et al. |
| 2009/0103503 A1 | 4/2009 | Chhabra |
| 2009/0121927 A1 | 5/2009 | Moshfeghi |
| 2009/0149197 A1 | 6/2009 | Morgan et al. |
| 2009/0154371 A1 | 6/2009 | Alizadeh-Shabdiz et al. |
| 2009/0161806 A1 | 6/2009 | Ananny et al. |
| 2009/0168843 A1 | 7/2009 | Waters et al. |
| 2009/0175189 A1 | 7/2009 | Alizadeh-Shabdiz et al. |
| 2009/0181695 A1 | 7/2009 | Wirola et al. |
| 2009/0187983 A1 | 7/2009 | Zerfos et al. |
| 2009/0189810 A1 | 7/2009 | Murray |
| 2009/0192709 A1 | 7/2009 | Yonker et al. |
| 2009/0196267 A1 | 8/2009 | Walker, Sr. |
| 2009/0231191 A1 | 9/2009 | Wu et al. |
| 2009/0251364 A1 | 10/2009 | Lorenz |
| 2009/0252138 A1 | 10/2009 | Alizadeh-Shabdiz et al. |
| 2009/0278705 A1* | 11/2009 | Chhabra et al. .......... 340/825.49 |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0039323 A1 | 2/2010 | Kosolobov et al. |
| 2010/0052983 A1 | 3/2010 | Alizadeh-Shabdiz |
| 2010/0195632 A1 | 8/2010 | Prabhu |
| 2010/0309051 A1 | 12/2010 | Moshfeghi |
| 2011/0012780 A1 | 1/2011 | Alizadeh-Shabdiz |
| 2011/0012784 A1 | 1/2011 | Alizadeh-Shabdiz |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0080841 A1 | 4/2011 | Alizadeh-Shabdiz et al. |

(56) References Cited

U.S. PATENT DOCUMENTS

| | | | |
|---|---|---|---|
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298659 A1 | 12/2011 | Alizadeh-Shabdiz |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0007775 A1 | 1/2012 | Alizadeh-Shabdiz |
| 2012/0021759 A1 | 1/2012 | Chen et al. |
| 2012/0100872 A1 | 4/2012 | Alizadeh-Shabdiz et al. |
| 2012/0108260 A1 | 5/2012 | Alizadeh-Shabdiz |
| 2012/0119258 A1 | 5/2012 | Liang |
| 2012/0196621 A1 | 8/2012 | Alizadeh-Shabdiz et al. |
| 2012/0280866 A1 | 11/2012 | Alizadeh-Shabdiz |

FOREIGN PATENT DOCUMENTS

| | | |
|---|---|---|
| EP | 0346461 | 7/1993 |
| EP | 0762363 | 3/1997 |
| EP | 0810449 | 3/1997 |
| EP | 0592560 | 7/1997 |
| EP | 0860710 | 8/1998 |
| EP | 0776485 B1 | 8/2000 |
| EP | 1359714 A2 | 11/2003 |
| GB | 2180425 | 11/1989 |
| GB | 2291300 | 1/1996 |
| JP | 62284277 | 6/1986 |
| JP | 03-235562 A | 10/1991 |
| JP | 04-035345 A | 2/1992 |
| JP | 06003431 | 1/1994 |
| JP | 06148308 | 5/1994 |
| WO | WO-9202105 | 2/1992 |
| WO | WO-9514335 | 5/1995 |
| WO | WO-9523981 | 9/1995 |
| WO | WO-9620542 | 7/1996 |
| WO | WO-9723785 | 6/1997 |
| WO | WO-9728455 | 8/1997 |
| WO | WO-9810538 | 3/1998 |
| WO | WO-9825157 | 6/1998 |
| WO | WO-03021851 | 3/2003 |
| WO | WO-2004002185 A1 | 12/2003 |
| WO | WO-2005004527 A1 | 1/2005 |
| WO | WO-2008006077 A2 | 1/2008 |
| WO | WO-2009149417 | 12/2009 |
| WO | WO-2010005731 | 1/2010 |
| WO | WO-2011008613 | 1/2011 |
| WO | WO-2011041298 | 4/2011 |
| WO | WO-2012061595 | 5/2012 |

OTHER PUBLICATIONS

"Best Practices for Hunting Down & Terminating Rogue Wireless LANs (WLANs)," AirDefense, Inc., available at www.airdefense.net, 2002-2005, 7 pages.
"Calculate AP Physical Location," NetStumbler.org Forums, Oct. 2012, 7 pages, available at http://www.netstumbler.org/netsstumbler/calculate-ap-physical-location-t9813.html.
"Current Kismet Readme," Kismet, Nov. 2012, 47 pages, available at http://kismetwireless.net/documentation.shtml.
"Distributed Wireless Security Auditor," IBM Research, Nov. 2012, 3 pages, available at http://www.research.ibm.com/gsal/dwsa.
"Ekahau Positioning Engine 2.0: 802.11-based Wireless LAN Positiioning System," Ekahau Technology Document, Nov. 2002, 19 pages.
"GPSDRIVE," Nov. 2012, available at http://gpsdrive.sourceforge.net/gpsdrive_manual-en.html, 13 pages.
"Indoor Radio Propagation," Spread Spectrum Scene, Nov. 2012, 7 pages, available at http://sss-mag.com/indoor.html.
1990-1991 Aviation System Capacity Plan, U.S. Department of Transportation, FAA. Dec. 20, 1990. 323 pages.
A Unique Solution, "HighwayMaster: Becoming the Mobile Communications System of Choice by Owner-Operators," Nov./Dec. 1994. 3 pages.
Adelstein et al., "Physically Locating Wireless Intruders," Journal of Universal Computer Science, vol. 11, No. 1, 2005, pp. 4-19.
AIM/FAR 1994, Airman's Information Manual / Federal Aviation Regulations: Section 2. Radio Communications Pharaseology and Techniques, Tab Aero Staff. 1994. 5 pages.
AJ Systems, Final Report and GPS System Specification for Shipboard Tacan Replacement. Submitted to Naval Air Development Center. Nov. 8, 1991. 195 pages.
Ambrosch et al., The Intelligent Network, a Joint Study by Bell Atlantic, IBM and Siemens, Springer-Verlag, ISBN 3-540-50897-X, 1989, Chapter 9, 18 pages.
Antonio, et al, "OmniTRACS: A commercial Ku-Band mobile satellite terminal and its applicability to military mobile terminals," 1988 IEEE Military Communications Conference, Oct. 23-26, 1998. 5 pages.
ASR-9 System, Instruction Book Field maintenance, Federal Aviation Administration, Nov. 2001. 410 pages.
Author Unknown, "LocalePoints," Newbury Networks, available at least as early as Oct. 2004, at http://replay.waybackmachine.org/20041009170934/hhttp://www.newburynetworks.com/products/coretech.php?localepoints, last accessed Apr. 14, 2011, 1 page.
Author Unknown, "LocaleServer," Newbury Networks, available at least as early as Oct. 2004, at http://replay.waybackmachine.org/20041010054718/http://www.newburynetworks.com/products/coretech.php, last accessed Apr. 14, 2011, 1 page.
Author Unknown, "Mobile Applications Suite," Pango, PanGo Mobile Applications Suite, available at leasst as early as Aug. 2003, at http://replay.waybackmachine.org/20030825161534/http://pangonetworks.com/mobile.htm and http://replay.waybackmachine.org/20031002103310/http://pangonetworks.com/products.htm, last accessed Apr. 14, 2011, 1 page.
Author Unknown, "Proximity Platform," Pango, PanGo Mobile Applications Suite, available at leasst as early as Aug. 2003, at http://replay.waybackmachine.org/20031002102757/http://pangonetworks.com/proximity.htm and http://replay.waybackmachine.org/20031002103310/http://pangonetworks.com/products.htm, last accessed Apr. 14, 2011, 1 page.
Author Unknown, Bluesoft, Inc., Aeroscout, available at http://replay.waybackmachiine.org/20030802052607/http:/bluesoft-inc.com/wlan.asp, Accessed on Apr. 14, 2011, 1 page.
Author Unknown, Netstumbler Blog Posting, "Wardriving as a Proxy for Wi-Fi Location," available at http://www.netstumbler.org/news/wardriving-as-a-proxy-for-wi-fi-gps-location-t10762.html, May 11, 2004-May 17, 2004, last accessed Apr. 13, 2004, 7 pages.
Bahl et al., "RADAR: An In-Building RF-based User Location and Tracking System," Proceedings IEEE Infocom 2000, pp. 775-784.
Balachandran et al., "Wireless Hotspots: Current Challenges and Future Directions," WMASH'03, Sep. 2003, 9 pages.
Battiti, et al., "Wireless LANs: From WarChalking to Open Access Networks," Mobile Networks and Applications 10, pp. 275-287, 2005.
Before the Federal Communications Commission, "Notice of Proposed Rule Making," In the Matter of: Revision of the Commission's rules to ensure compatibility with enhanced 911 emergency calling systems, Oct. 19, 1994. 53 pages.
Before the Federal Communications Commission, "Report and Order and Further Notice of Proposed Rulemaking," in the Matter of: Revision of the Commission's Rules to Ensure Compatibility with Enhanced 911 Emergency Calling Systems, Jul. 26, 1996. 98 pages.
Before the Federal Communications Commission, Comments of AT&T Corp, In the matter of: Revision of the Commission's Rules to Ensure Compatibility with Enhanced 911 Emergency Calling Systems. Jan. 9, 1995. 25 pages.
Bhasker et al., "Employing User Feedback for Fast, Accurate, Low-Maintenance Geolocationing," Proceeding PERCOM '04 Proceedings of the Second IEEE International Conference on Pervasive Computing and Communications (PerCom'04), IEEE Computer Society Washington, DC., USA, 2004, 10 pages.

(56) References Cited

OTHER PUBLICATIONS

Birkland, "Track, Talk, Tell: On-board communications systems, and the software that gives those systems power, give fleets the opprotunity to track trucks and cargo, talk to drivers and receive vital vehicle systems information," Management Techniques, Fleet Equipment, Jun. 1994. 6 pages.
Bjorndahl et al., "CME20—A Total Solution for GSM Networks," Ericsson Review No. 3, 1991, 8 pages.
Bogue, "Using NetStumbler and MiniStumbler to Find Rogue Access Points on Wireless Networks," TechRepublic, CIO Top 50 6th Annual Event, 2012, 5 pages.
Branch et al., "Autonomic 802.11 Wireless LAN Security Auditing," IEEE Computer Society, 2004, pp. 56-65.
Brewin, "IBM Develops Tool to Detect Rogue Wireless LAN Access Points," Nov. 2012, 5 pages, available at http://www.computerworld.com/s/article/72065/IBM_develops_tool_to_detect_rogue_wi.
Bronson, et al, "II Morrow's Loran-C Based Vehilce Tracking System," Presented at Nav 85 Land Navigation and Location for Mobile Applications, Sep. 9-11, 1985, 13 pages.
Brown, "Navigation, Surveillance, and Communications Services within the Province of Ontario," Journal of the Institute of Navigation, vol. 35, No. 4, Winter 1988-1989. 7 pages.
Buccafurno, "The Philadelphia Story," TE&M Special Report 911, Dec. 1987, pp. 68-72.
Byers et al., "802.11B Access Point Mapping," Communications of the ACM, May 2003, vol. 46, No. 5, pp. 41-46.
C.J. Driscoll & Associates, "Survey of Location Technologies to Support Mobile 9-1-1," Survey Conducted for State of California, Jul. 1994. 59 pages.
California Legislature, Senate on Energy and Public Utilities, Joint Interim Hearing on the 911 Emergency Responsne System—An Overview of its Effectiveness, Nov. 21, 1990, 107 pages.
Candler, "Tracking all Trucks," Transportation, Nation's Business, Dec. 1994. 3 pages.
Capkun et al., "GPS-free Positioning in Mobile Ad Hoc Networks," Cluster Computing, 5, pp. 157-167, 2002.
Carroll, "Availability Performance Comparisons of Combined Loran-C/Gps and Standalone GPS Approach Navigation Systems," Position Location and Navigation Symposium, 1994., IEEE. Apr. 11-15, 1994. pp. 77-83.
Carter, "Using Loran-C for Automatic Vehicle Monitoring," Navigation: Journal of the Institute of Navigation, vol. 29, No. 1, Spring 1982. 9 pages.
Carter, et al, "Using Cellular Telephones for Automatic Vehicle Tracking," Presented at Nav 85 Land Navigation and Location for Mobile Applications, Sep. 9-11 1985. 10 pages.
Cassidy, "HighwayMaster Goes Flat-Out in Communications Race," Transport Topics, Aug. 8, 1994. 2 pages.
Castro, "A Probablistic Room Location Service for Wireless Networked Environments," Ubicomp 2001: Ubiquitous Computing, International Conference, Atlanta, Georgia, Sep. 30-Oct. 2, 2001, Proceedings, 10 pages.
Chadwick, "Projected Navigation System Requirements for Intelligent Vehicle Highway Systems (IVHS)." Proceedings of the 7th International Technical Meeting of the Satellite Division of the Institute of Navigation (ION GPS 1994), Sep. 1994. pp. 485-490.
Chambers, et al., "A Comparison of Automatic Vehicle Tracking Systems," Navigation: Journal of the Institute of Navigation, vol. 21, No. 3, Fall 1974, pp. 208-222.
Chawathe et al., "A Case Study in Building Layered DHT Applications," SIGCOMM '05 Proceedings of the 2005 Conference on Applications, Technologies, Architectures, and Protocols for Computer Communications, pp. 97-108, Jan. 2005, 15 pages.
Cheng et al., "Accuracy Characterization for Metropolitan-scale Wi-Fi Localization," MobiSys '05 Proceedings of the 3rd International Conference on Mobile Systems, Applications, and Services, pp. 233-245, 13 pages.
Cobb, et al., "Precision Landing Tests with Improved Integrity Beacon Pseudolites," Department of Aeronautics and Astronautics, Stanford University, Sep. 1995. 7 pages.

Connelly et al., "A Toolkit for Automatically Constructing Outdoor Radio Maps," Proceedings of the International Conference on Information Technology: Coding and Computing, ITCC, Apr. 4-6, 2005, Las Vegas, Nevada, IEEE, 7 pages.
Cortland, "Loran-C Vehicle Tracking in Detroit's Public Safety Dispatch System," Navigation: Journal of the Institute of Navigation, vol. 36, No. 3, Fall 1989. 11 pages.
Crow, "Auditing for Rogue Wireless Access Points in a Large Corporate Campus," Global Information Assurance Certification Paper, Sep. 18, 2003, 21 pages.
Dayharsh, et al., "Update on the National Emergency No. 911," IEEE Transactions on Vehicular Technology, vol. VT-28, No. 4, Nov. 1979, pp. 292-297.
Delong, "Making 911 Even Better," Telephony Integrating Voice and Data Communications, Telephoney, Dec. 1987, 6 pages.
DeNigris et al., "Ehanced 911: Emergency Calling With a Plus," Bell Laboratories Record, Mar. 1980, 6 pages.
DiEsposti et al., "Benefits and Issues on the Integration of GPS with a Wireless Communications Link," 29th Annual PTTI Meeting, Dec. 1997, pp. 391-398.
Eckerson, "Users Test Toll-Free Net Access Options," Management Strategies, Network World, Dec. 1991/Jan. 1992, pp. 17-18.
Ekahau Client 3.0 Build 136 Release Notes, Available at http://replay.waybackmachine.org/20030929003821/http:/www.ekahau.com/products/client, Apr. 14, 2011, 4 pages.
Ekahau, "Ekahau Site Survey 1.0, Maximize Coverage—Minimize Channel Interference," Available at http://replay.waybackmachine.org/20030807204446/http:/www.ekahau.com/products/siites, Apr. 14, 2011, 2 pages.
Ekahau, "Technology Overview", Available at http://replay.waybackmachine.org/20031008125411/http:/www.ekahau.com/products, Apr. 14, 2011, 8 pages.
Ekahau, "Technology Overview," Available at http://replay.waybackmachine.org/2003/20031008125411/http:/www.ekahau.com/products, Apr. 14, 2011, 1 page.
Ekahau, "Why Ekahau Site Survey?," Available at http://replay.waybackmachine.org/20030801080918/http:/www.ekahau.com/products/sites, Apr. 14, 2011, 1 page.
Ellison, "Exploiting and Protecting 802.11b Wireless Networks," Nov. 2012, 8 pages, available at http://www.extremetech.com/computing/57646-exploiting-and-protecting-80211b-wireless.
Elnahrawy, et al., "Using Area-Based Presentations and Metrics for Localization Systems in Wireless LANs," Proceedings of the 29th Conference on Local Computer Networks, IEEE, LCN 2004, Tampa, Florida, Nov. 16-18, 2004, 9 pages.
Enge, "Combining Pseudoranges from GPS and Loran-C for Air Navigation," Position Location and Navigation Symposium, 1990, Mar. 20-23, 1990. pp. 36-43.
Etter, "A Guide to Wardriving and Detecting Wardrivers," SANS Institute InfoSec Reading Room, 2002, 16 pages.
FAA Historical Chronology, 1926-1996. 303 pages.
Farradyne Systems, Inc. et al., TravTek Evaluation Plan—Final, Prepared for Federal Highway Administration, Apr. 4, 1991. 62 pages.
Fernandez et al., "GPS Navigation Subsystem for Automatic Vehilce Location Systems,"Presented at the Nav 90 Land Navigation and Information Systems Conference, Sep. 18-20, 1990. 12 pages.
Foust, "identifying and Tracking Unauthorized 802.11 Cards and Access Points," The Magazine of Usenix & Sage, Aug. 2002, vol. 27, No. 4, 13 pages.
Frederickson, "Approximation Algorithms for Some Postman Problems," Journal of the Association for Computing Machinery, vol. 26, No. 3, Jul. 1979, pp. 538-554.
French, "MAP Matching Origins Approaches and Applications," Proceedings of the Second International Symposium on Land Vehicle Naviation, Jul. 1989, 28 pages.
French, "The Evolving Roles of Vehicular Navigation," Navigation: Journal of the Institute of Navigation, vol. 34, No. 3, Fall 1987, pp. 212-228.
French, et al., "A Comparison of IVHS Progress in the United States, Europe and Japan," Dec. 31, 1993, Prepared by R.L. French & Associates for IVHS America, 216 pages.

(56) References Cited

OTHER PUBLICATIONS

Frye, "GPS Signal Availability in Land Mobile Applications," Navigation: Journal of the Institute of Navigation, vol. 36, No. 3, Fall 1989. 15 pages.
Galijan et al., "Results of a Study into the Utility of Carrier Phase GPS for Automated Highway Systems," The Institute of Navigation, Proceedings of ION GPS-94, Sep. 20-23, 1994. pp. 533-541.
Global Positioning & Navigation News, AVL Markets: More than Position Reporting, vol. 6., No. 16. Aug. 8, 1996. 3 pages.
GPS World News and Applications of the Global Positioning System, GPS World Newsletter, Apr. 11, 1994. 4 pages.
GPS World News and Applications of the Global Positioning System, GPS World Newsletter, Jul. 1994. 2 pages.
GPS World Newsletter, Sep. 9, 1993. 2 pages.
Griswold et al., "ActiveCampus: Experiments in Community-Oriented Ubiquitous Computing," IEEE, Oct. 2004, pp. 73-81.
Griswold, et al., "ActiveCamus—Sustaining Educational Communities through Mobile Technology," UCSD CSE Technical Report #CS200-0714, 2002, 19 pages.
Harvey et al., "Call Center Solutions," AT&T Technical Journal, Sep./Oct. 1991, 11 pages.
Hatami et al., "A Comparative Performance Evaluation of RSS-Based Positioning Algorithms Used in WLAN Networks," 2005 IEEE Wireless Communications and Networking Conference, Mar. 13-17, 2005, New Orleans, LA, 8 pages.
Hazas, M., et al., "Location-Aware Computing Comes of Age," IEEE, vol. 37, Feb. 2004, 3 pages.
Head, "Intelligent Network: A Distributed System," IEEE Communications Magazine, Dec. 1988, 5 pages.
Hellebrandt, et al., "Estimating Position and Velocity of Mobiles in a Cellular Radio Network," IEEE Transactions on Vehicular Technology, vol. 46, No. 1, Feb. 1997, pp. 65-71.
Henderson et al., "The Changing Usage of a Mature Campus-Wide Wireless Network," MobiCom '04, Sep. 26-Oct. 1, 2004, 15 pages.
Hightower et al., "A Survey and Taxonomy of Location Systems for Ubiquitous Computing," Technical Report UW-CSE 01-08-03, Aug. 2001, 29 pages.
Hightower et al., "Location Sensing Techniques," IEEE Computer Magazine, Aug. 2001, 8 pages.
Hightower et al., "The Location Stack," Intel Research Seattle, Dieter Fox, University of Washington, IRS-TR-03-008, Jul. 2003, 13 pages.
Highway Master Mobile Communication & Information Systems, Press Release for Immediate Release, Dec. 16, 1994. 2 pages.
Highway Master Mobile Communication & Information Systems, Press Release for Immediate Release, Jan. 11, 1995. 2 pages.
Highway Master Mobile Communication & Information Systems, Press Release for Immediate Release, Jan. 12, 1995. 2 pages.
Hojo et al., "Land-Mobile GPS Receiver," Proceedings of the 3rd International Technical Meeting of the Satellite Division of the Institute of Navigation (ION GPS 1990), Sep. 1990. pp. 183-190.
Honeywell, Inc., "A310/A300 Flight Management System Pilot's Guide," Dec. 1993, Rev. 1, 441 pages.
Hong et al., "Privacy and Client-Based Discovery of Location," 10 pages, retrieved at http://www.cs.cmu.edu/jasonh/publications/, Dec. 8, 2003.
Hong et al., "Privacy and Security in the Location-Enhanced World Wide Web," In Proceedings of the Workshop on Privacy at Ubicomp 2003, Oct. 2003, 5 pages.
Honig, "The Realities of Service Creation on Switching Systems Through Attached Processors," XIII International Switching Symposium, Session B9, Paper #4, Proceedings vol. VI, May 27-Jun. 1, 1990, 4 pages.
Howe, "The Feasibility of Applying the Active TvTime System to Automatic Vehicle Location," Navigation: Journal of the Institute of Navigation, vol. 21, No. 1, Spring 1974. 7 pages.
Huffman Coding, Wikipedia, 10 pages, downloaded from http://en.wikipedia.org/wiki.Huffman_coding, Dec. 28, 2010.
Hunter et al., "Land Navigation and Fleet Management with GPS, Loran, and Dead Reckoning Sensors," IEEE, 1988, pp. 54-60.
Hunter, "The Sources of Innovation in New Jersey Bell Switching Services," Master of Science Thesis, Massachusetts Institute of Technology, Sloan School of Management, Jun. 1991, 105 pages.
Hurley, "War Driving Drive, Detect, Defend a Guide to Wireless Security," Syngress Publishing, Inc., 2004, retrieved from soiutions@syngress.com, 3 pgs.
Hurley, et al., "WarDriving: Drive, Detect, Defend, A Guide to Wireless Security," Syngress Publishing, Nov. 2012, 3 pages, available at http://net-security.org/review.php?id=144.
ICAO Circular, Secondary Surveillance Radar Mode S Advisory Circular, International Civil Aviation Organization, 1983. 44 pages.
II Morrow Inc., Kern County Adds Eyes, Mar. 10, 1986. 8 pages.
II Morrow Inc., Press Release for Immediate Release: II Morrow's VTS finds new application, Oct. 13, 1986. 2 pages.
II Morrow Inc., Press Release for Immediate Release: Lafayette Parish adds Vehicle Tracking, Sep. 8, 1986. 2 pages.
II Morrow Inc., Press Release for Immediate Release: Los Alamos selects II Morrow's VTS, Sep. 9, 1986. 2 pages.
II Morrow Inc., Press Release for Immediate Release: Pinellas County Florida Chooses II Morrow, Sep. 4, 1986. 2 pages.
II Morrow Inc., Release for Immediate Release: Punta Gorda Florida Adds Police Car Tracking System, Aug. 28, 1986. 2 pages.
II Morrow Inc., The vision to take fleet management one step further, 1992. 8 pages.
II Morrow Inc., Vehicle Tracking System References, 1986. 6 pages.
II Morrow Inc., Vehicle Tracking System Specification Sheets, Date not listed. 10 pages.
Inman, et al., "TravTek Evaluation Rental and Local User Study," U.S. Department of Transporation, Federal Highway Administration, Mar. 1996, Publication No. FHWA-RD-96-028, 105 pages.
Inman, et al., "TravTek Evaluation Yoked Driver Study," U.S. Department of Transportation and Federal Highway Administration, Oct. 1995, Publication No. FHWA-RD-94-139, 101 pages.
International Search Report and Written Opinion of the International Search Authority for International Application No. PCT/US2011/059139, dated Jan. 31, 2012, 12 pages.
International Search Report and Written Opinion of the International Search Authority for International Application No. PCT/US2009/046504, mailed Oct. 7, 2009, 12 pages.
International Search Report and Written Opinion of the International Search Authority for International Application No. PCT/US2010/041282, mailing date of Aug. 30, 2010, 8 pages.
International Search Report and Written Opinion of the International Search Authority for International Application No. for PCT/US09/047527, mailing date Aug. 18, 2009, 10 pages.
International Search Report and Written Opinion of the International Searching Authority, for International Application No. PCT/US2010/050511, dated Dec. 30, 2010, 8 pages.
International Search Report and Written Opinion of the International Searching Authority, for International Application No. PCT/US2010/050742, dated Dec. 3, 2010, 9 pages.
Irvine Police Department: Memorandum by Lt. Gene Norden. 1986. 3 pages.
Ishikawa et al., "Proposal of High Accuracy Positioning Service for Terrestrial Mobile Communication Systems by Using GPS Satellites," The Institute of Electronics, Information and Communication Engineers, vol. J76-B-II, No. 5. pp. 363-372. (1993).
Jin et al., "802.11-based Positioning System for Context Aware Applications," IEEE, 2003, pp. 929-933.
Juneja et al., "Location Services Using Cellular Digital Packet Data," Highes Software Systems, ICPWC'96, pp. 222-226.
Junius et al., "New Methods for Processing GSM Radio Measurement Data: Applications for Locating, Handover, and Network Management," Communication Networks, Aachen University of Technology, 1994. pp. 338-342.
Kang et al., "Extracting Places from Traces of Locations," WMASH '04 Proceedings of the 2nd ACM International Workshop on Wireless Mobile Applications and Services on WLAN Hotspots, Oct. 2004, pp. 110-118.
Kawabata et al., "Estimating Velocity Using Diversity Reception," IEEE, 1994, 4 pages.

(56) References Cited

OTHER PUBLICATIONS

Kennedy et al., "Direction Finding and "Smart Antennas" Using Software Radio Architectures," IEEE Communications Magazine, May 1995. pp. 62-68.
Kent et al., "Position Estimation of Access Points in 802.11 Wireless Networks," White Paper, Sep. 2003, Lawrence Livermore National Laboratory, Livermore, California, 10 pages.
Kim et al., "Risks of Using AP Locations Discovered through War Driving," Lecture Notes in Computer Science, vol. 3968, 2006, 15 pages.
Kirsner, "One More Way to Find Yourself," The Boston Globe, May 23, 2005, retrieved from www.boston.com, 3 pages.
Kirtner, et al., "The Application of Land Use/Land Cover Data to Wirleess Communication System Design," Proceedings of the ESRI User Conference, 1998, 16 pages.
Komar et al., "Location Tracking and Location Based Service Using IEEE 802.11 WLAN Infrastructure," European Wireless 2004, Feb. 24-27, 2004, 7 pages.
Krumm et al., "The NearMe Wireless Proximity Server," UbiComp 2004, LNCS 3205, pp. 283-300.
Krumm, et al., "LOCAIDO: Interferring Motion and Location from Wi-Fi Signal Strengths," First Annual International Conference and Mobile and Ubiquitous Systems: Networking and Services, Aug. 2004, 17 pages.
Kugler et al., "Combined Use of GPS and Loran-C in Integrated Navigation Systems," IEEE, 1996. pp. 161-168.
Kwan, "GLOBALSTAR: Linking the World via Mobile Connections," IEEE Intl. Symposium on Personal, Indoor & Mobile Radio Communications, pp. 318-223, Sep. 25, 1991.
Kwan, "Graphic Programming Using Odd or Even Points," Chinese Mathematics, vol. 1, No. 3, 1962, Translation of ACTA Mathematica Sinica, 10, No. 3, 1960, 7 pages.
Lachapelle et al., "Analysis of GPS and Loran-C Performance for Land Vehicle Navigation in the Canadian Rockies," IEEE, 1992. pp. 504-508.
Lachapelle et al., "Analysis of Loran-C Performance in the Pemberton Area, B.C." Canadian Aeronautics and Space Journal, vol. 38, No. 2, Jun. 1992, pp. 52-61.
Lachapelle et al., "GPS/Loran-C: An Effective System Mix for Vehicular Navigation in Mountainous Areas," Journal of the Institute of Navigation, vol. 40, No. 1, Spring 1993. pp. 19-34.
Lackey et al., "Wireless Intrusion Detection," Apr. 2003, IBM Global Services, 16 pages, retrieved from www.forum-intrusion.com/wireless_intrusion_detection.pdf.
LaMarca et al., "Place Lab's First Step: A Location-Enhanced Conference Guide," IEEE Spectrum at 51-54, Dec. 2004, 3 pages.
LaMarca et al., "Place Lab: Bootstrapping Where-ware," Place Lab, Jul. 23, 2011, 19 pages, retrieved from www.placelab.org.
LaMarca et al., "Self-Mapping in 802.11 Location Systems," Intel Corporation, 2005, 18 pages.
LaMarca, et al., "Finding Yourself," IEEE Spectrum, Dec. 2004, 3 pages.
LaMarca, et al., Place Lab: Device Positioning Using Radio Beacons in the Wild, Oct. 2004, 20 pgs.
Lappin, "Truckin'," Wired, Issue 3.01, Jan. 1995. Accessed on Aug. 27, 2012 on www.wired.com/wired/archive/3.01/truckin.html. 11 pages.
Lee, "Trucking Takes the High (Tech) Road," Radio Resource Magazine, Jan.-Feb. 1994, 9 pages.
Lee, "Wireless Surveying on the Pocket PC," May 2004, 7 pages, available at http://www.oreillynet.com/lpt/a/4876.
Leslie, "Rogue Wireless Access Point Detection and Remediation," Global Information Assurance Certification Paper, Sep. 2004, 15 pages, retrieved from www.giac.org/paper/gsec/4060/rogue-wireless-access-point-detection-remediation/106460.
Letchner et al., "Large-Scale Localization from Wireless Signal Strength," In Proc. Of the National Conference on Artificial Intelligence (AAAI), 2005, 6 pages.
Lorincz, et al., "MoteTrack: A Robust, Decentralized Approach to RF-Based Location Tracking," First International Workshop, LoCA 2005, LNCS 3479, Oberpfaffenhofen, Germany, May 12-13, 2005 Proceedings, 21 pages.
Machalaba, "Long Haul: Trucking Firms Face Driver Shortage, Idling Some Rigs and Causing Delays for Shippers", The Wall Street Journal, Dec. 28, 1993. 2 pages.
Magnavox, "Presenting the Most Advanced AVLS Available", 1988. 6 pages.
Mallinder, "The Final Count-Down to GSM, GSM System Aspects," 1991 Pan European Digital Cellular Radio Conference, Feb. 5-6, 1991, Acropolis Conference Centre, Nice, France, 12 pages.
Mammano et al., "Pathfinder System Design," IEEE, 1989. pp. 484-488.
Marcelo, "Vehicle Location System Serves Public Safety Agencies," Mobile Radio Technology, vol. 4, Issue 12, Dec. 1986. 5 pages.
Maturino-Lozoya et al., "Pattern Recognition Techniques in Handoff and Service Area Determination," IEEE Vehicular Technology Conference, Jun. 1994. pp. 96-100.
Mele, "Mid-America Dairymen Proves That It Pays," Fleet Owner, 1 page. 1994.
Milk & Liquid Food Transporter, "Mid-Am installs Voice Communications," vol. 34, No. 5, May 1994. 1 page.
Milner, "NetStumbler v0.4.0 Release Notes," available at http://downloads.netstumbler.com/downloads/netstumbler_v0.4.0_release_notes.pdf, Apr. 18, 2007, 10 pages.
Morris, et al., "Omega Navigation System Course Book," U.S. Department of Transportation, United States Coast Guard, vol. 1, Jul. 1994, 60 pages.
Muthukrishnan, K. et al., "Towards Smart Surroundings: Enabling Techniques and Technologies for Localization," Lecture Notes in Computer Science, vol. 3479, May 2005, 11 pages.
Myllymaki et al., "Location Aggregation from Multiple Sources," IBM Almaden Research Center, MDM '02 Proceedings of the Third International Conference on Mobile Data Management, pp. 131-138, IEEE Computer Society Washington, DC, 2002.
Ndili, "GPS Pseudolite Signal Design," Presented at ION-GPS-94, Sep. 1994. 8 pages.
New Jersey Bell Network Proposal, Sent by Gojanovich and DePaola on Nov. 20, 1989 to the Network Subcommittee of the State of New Jersey, 9-1-1, 34 pages.
Papadimitriou, "On the Complexity of Edge Traversing," Journal of the Association for Computing Machinery, vol. 23, No. 3, Jul. 1976, pp. 544-554.
Parish, "Case Studies of Market Research for Three Transportation Communication Products," U.S. Dept of Transportation, Mar. 1994. 70 pages.
Parviainen, et al., Mobile Information Systems Impact Study, Ontario Ministry of Transporation, Aug. 1988, 236 pages.
Perlstein et al., "Designing and Implementing Automatic Vehicle Location," Mobile Radio Technology, Jan. 1989. 6 pages.
Perlstein, "Automatic Vehicle Location Systems: A Tool for Computer Aided Despatch Systems of the Future," IEEE, 1989. pp. 186-193.
Perry, "In Search of the Future of Air Traffic Control," IEEE Spectrum, Aug. 1997, pp. 19-35, 18 pages.
Peterson et al., "Evaluation of Radionavigation Systems in an Urban Environment," Proceedings of the 1995 National Technical Meeting of the Institute of Navigation, Jan. 1995. pp. 293-302.
Pilley et al., "Airport Navigation and Surveillance Using GPS and ADS,"Proceedings of the 4th International Technical Meeting of the Satellite Division of the Institute of Navigation (ION GPS 1991), Sep. 1990. pp. 363-371.
Post, "Real-Time Linear Ensemble Averaging LORAN Receiver Architecture," The Institute of Navigation, Jun. 27-29, 1989. pp. 67-75.
Raniwala, et al., "Deployment Issues in Enterprise Wireless LANs," RPE Report, Sep. 2003, 36 pages.
Rappaport, "Position Location Using Wireless Communications on Highways of the Future," IEEE Communications Magazine, Oct. 1996. pp. 33-41.
Refrigerated Transport, "Mid-America Dairymen Picks HighwayMaster," Mar. 1994. 1 page.

(56) References Cited

OTHER PUBLICATIONS

Riley et al., "Vehicle Tracking System for Salem, Oregon Police Department," The Instutute of Navigation, Proceedings of the National Technical Meeting, Jan. 21-23, 1986. pp. 89-94.
Robinson et al., "Received Signal Strength Based Location Estimation of a Wireless LAN Client," 2005 IEEE Wireless Communications and Networking Conference, vol. 4, Mar. 13-17, 2005, New Orleans, LA, 6 pages.
Rothblatt, "The First GPS Satellite Radio Optimized for Automatic Vehicle Loaction," Position Locaiton and Navigation Symposium, Mar. 23-27, 1992. pp. 261-263.
Saha et al., "Location Determination of a Mobile Device Using IEEE 802.11b Access Point Signals," 2003 IEEE Wireless Communications and Networking, Mar. 16-20, 2003, New Orleans, Louisiana, Conference Record, 7 pages.
Saldin, "Magnavox Automatic Vehicle Loaction Pilot System for the Toronto Department of Ambulance Services," Vehicle Navigation & Information Systems, IEEE, Sep. 11-13, 1989. pp. 194-201.
Santo, "Enables Reliable Autopilot Aircraft Touchdowns," Electronic Engineering Times, Nov. 14, 1994. 7 pages.
Schilit et al., "Challenge: Ubiquitous Location-Aware Computing and the "Place Lab" Initiative," WMASH '03 Proceedings of the 1st ACM International Workshop on Wireless Mobile Applications and Services on WLAN Hotspots, Sep. 2003, pp. 29-35.
Schilit, et al., "Bootstrapping the Location-enhanced World Wide Web," Workshop on Location-Aware Computing (at UbiComp 2003), Seattle, WA, Oct. 2003, 4 pages.
Schlachta et al., "Interoperability versus Integration of Omega and GPS," The Journal of Navigation, vol. 43, No. 2, May 1990. pp. 229-237.
Schmandt et al., "The New Urban Infrastructure, Cities and Telecommunications," Praeger Publishers, 1990, ISBN: 0-274-93591-4, 28 pages.
Shih, "Wireless LAN Location System," A Thesis Submitted for the Degree of Master of Engineering, Nov. 2003, School of Information Technology and Electrical Engineering, The University of Queensland, 98 pages.
Shipley, "802.11b War Driving and LAN Jacking," DEFCON 9 Conference, Las Vegas, Nevada, USA, Jul. 13-15, 2001, available at http://www.defcon.org/html/links/dc-archives/dc9-archive.html, last accessed Apr. 13, 2011, video and transcript, 49 pages.
Shipley, "Open WLANs the early results of war Driving," DEFCON9 Conference 802.11 b War Driving Presentation, 39 pages, 2001.
Skoblicki, "Automatic Vehicle Location (AVL) Using GPS Enhanced Dead Reckoning," Presented at VNIS 1991 International Conference on Vehicle Navigation & Information Systems, Oct. 22, 1991. 9 pages.
Small et al., "Determining User Location for Context Aware Computing Through the Use of a Wireless LAN Infrastructure," Dec. 2000, retrieved from http://www.ices.cmu.edu/reports/040201/pdf. 8 pages.
Spielman et al., Java and GIS, Part 1: Intro to GIS, Feb. 2004, available at http://today.java.net/pub/a/today/2004/02/16/gis.html, last accessed Apr. 14, 2011, 4 pages.
Spielman et al., Java and GIS, Part 2: Mobile LBS, Apr. 2004, available at http://today.java.net/pub/a/today/2004/04/01/gis.html, last accessed Apr. 14, 2011, 6 pages.
Standord and Texas Advisory Commission on Intergovernmental Relations, "Implementing 9-1-1 Systems in Texas: Legal and Institutional Background," Jun. 1987, 61 pages.
Stein et al., "Psuedolite-Aided GPS: A Comparison," IEEE Position Location and Navigation Symposium, 1988. pp. 329-333.
Sterling, et al., The Iridium System—A Revoluntionary Satellite Communications System Developed with Innovative Applications of Technology, IEEE Communications Society, 1991, Milicom '91, pp. 0436-0440.
Stewart, "Vehicle Location and Position Monitoring System Using Satellite Navigation and Cellular Telephone," IEEE Digest No. 112, p. 7/1-15, Jun. 8, 1993. 15 pages.
Stone, "Kismet & GPSdrive: Wireless Network Sniffling with Open Software," UKUUG Leeds, 2004, 32 pages.
Taheri et al., "Location Fingerprinting on Infrastructure 802.11 Wireless Local Area Networks," Proceedings of the 29th Annual IEEE International Conference on Local Computer Networks (LCN'04), Nov. 16-18, 2004, Tampa, Florida, 9 pages.
Tanabe et al., "Experimental Validation of GPS-INS-STAR Hybrid Navigation System for Space Autonomy," Acta Astronautica, vol. 21, No. 5, 1990. pp. 295-308.
Taylor, "TravTek-Information and Services Center," SAE Technical Paper 912823, 1991. Author: Kent B. Taylor, American Automobile Assoc. 12 pages.
Terminal Equipment and Protocols for Telematic Services, CCITT, The International Telegraph and Telephone Consultative Committee, International Telecommunication Union, Sep. 1992, 186 pages.
The Intelligent Highway, vol. 4, Issue 18, Mar. 18, 1994. 3 pages.
Thrall of the U.S. Coast Guard, "Advantages of Interoperability to the Prudent Navigator," Proceedings of the 48th Annual Meeting of the Institute of Navigation, Jun. 1992. pp. 47-50.
Torrone, "How-To Tuesday: War Kayaking," Nov. 2012, 5 pages, available at www.engadget.com/2004/06/22-how-to-Tuesday-warkayaking.
Trav-Tek System Architecture Evaluation, U.S. Department of Transportation, Federal Highway Administration, Jul. 1995, Publication No. FHWA-RD-94-141, 156 pages.
U.S. Department of Transportation FAA Advisory Circular, Airworthiness Approval of Global Positioning System (GPS) Navigation Equipment for Use as a VFR and IFR Supplemental Navigation System, AC No. 20-138, May 25, 1994. 33 pages.
U.S. Department of Transportation FAA Advisory Circular, Airworthiness Approval of Loran-C Navigation Systems for Use in the U.S. National Airspace System (NAS) and Alaska, AC No. 20-121A, Aug. 24, 1988. 21 pages.
U.S. Department of Transportation FAA Advisory Circular, Airworthiness Approval of Navigation or Flight Management Systems Integrating Multiple Navigation Sensors, AC No. 20-130A, Jun. 14, 1995. 50 pages.
U.S. Department of Transportation FAA Advisory Circular, Airworthiness Approval of Omega/VLF Navigation Systems for Use in the U.S. National Airspace System (NAS) and Alaska, AC No. 20-101C, Sep. 12, 1988. 31 pages.
U.S. Department of Transportation FAA Advisory Circular, Approval of Flight Management Systems in Transport Category Airplanes, AC No. 25-15, Nov. 20, 1989. 30 pages.
U.S. Government Memorandum from Keegan to Caton regarding TR45 Joint Experts Meeting Report. Oct. 28, 1994. 25 pages.
Van Aerde et al., "TravTek Evaluation Modeling Study," U.S. Department of Transportation, Federal Highway Administration, Mar. 1996, 134 pages.
van Graas, "Hybrid GPS/Loran-C: A Next-Generation of Sole Means Air Navigation," A Dissertation Presented to the Faculty of the College of Engineering and Technology, Ohio University, Nov. 1988, 185 pages.
van Graas, "Multisensor Signal Processing Techniques (Hybrid GPS/Loran-C with RAIM)," U.S. Department of Transportation, Federal Aviation Administration, Sep. 1991.
van Willigen et al., "Eurofix: GNSS Augmented Loran-C & Loran-C Augmented GNSS," Proceedings of the 1995 National Technical Meeting of the Institute of Navigation, Jan. 1995. pp. 337-344.
Waid et al., "Relative GPS Using DME-TACAN Data Link," Proceedings of the 7th International Technical Meeting of the Satellite Division of the Institute of Navigation (ION GPS 1994), Sep. 1994. pp. 851-861.
Wallace, "Domino's Delivers Using New Call Routing Service," Network World, vol. 8, No. 32, Aug. 1991, 2 pages.
Wang et al., "Two New Algorithms for Indoor Wireless Positioning System (WPS)," Proceedings of the 17th International Technical Meeting of the Satellite Division of the Institute of Navigation, 2004, 8 pages.
Welch, et al., "A Survey of 802.11a Wireless Security Threats and Security Mechanisms," A Technical Report to the Army G6, 20

(56) References Cited

OTHER PUBLICATIONS pages, retrieved from www.itsec.gov.cn/docs/20090507161931121853.pdf. Date not available.

Weseman, "Loran-C: Present and Future," Journal of the Institute of Navigation, vol. 29, No. 1, Spring 1982. pp. 7-21.

Whitcomb, "Using Low Cost Magnetic Sensors on Magnetically Hostile Land Vehicles," IEEE, 1988. pp. 34-35.

Wikipedia, "Delta Encoding," 5 pages, retrieved from http://en.wikipedia.org/wiki/Delta_encoding (Dec. 28, 2010).

Wikipedia, "Dilution of Precision (GPS)," May 2009, 3 pages, http://web.archive.org/web/20090516014557/http://en.wikipedia.org/wiki/Dilution_of_pre . . . Jul. 28, 2011.

Wilson et al., "A Lagrangian Drifter with Inexpensive Wide Area Differential GPS Positioning," Prospects for the 21st Century, Conference Proceedings, IEEE, Sep. 23-26, 1996. pp. 851-856.

* cited by examiner

414

414

410
412  412

416

WLAN-PS 401

METHODS AND SYSTEMS FOR DETERMINING LOCATION USING A CELLULAR AND WLAN POSITIONING SYSTEM BY SELECTING THE BEST WLAN PS SOLUTION

CROSS-REFERENCE TO RELATED APPLICATIONS

This application is a continuation of prior U.S. patent application Ser. No. 12/485,588, entitled, Methods and Systems for Determining Location Using a Cellular and WLAN Positioning System by Selecting the Best WLAN PS Solution, filed Jun. 16, 2009, now U.S. Pat. No. 8,462,745, which claims the benefit under 35 U.S.C. §119(e) of U.S. Provisional Application No. 61/061,853, filed on Jun. 16, 2008, entitled "Integrated WLAN-Based and Cellular-Based Positioning System," each of which is herein incorporated by reference in its entirety.

This application is related to the following references:

U.S. patent application Ser. No. 12/485,591, filed Jun. 16, 2009 and entitled "Methods and Systems for Determining Location Using a Cellular and WLAN Positioning System by Selecting the Best Cellular Positioning System Solution;" and U.S. patent application Ser. No. 12/485,595, filed Jun. 16, 2009 and entitled "Methods and Systems for Improving the Accuracy of Expected Error Estimation in Location Determinations Using a Hybrid Cellular and WLAN Positioning System."

BACKGROUND

1. Field

The disclosure generally relates to hybrid positioning systems and, more specifically, to methods of integrating a wireless local area network (WLAN)-based positioning system (WLAN PS) and a cellular-based positioning system (CPS) to improve the accuracy of location estimates, increase availability of the positioning service to more users, and also to improve estimation of the expected error in a user's position estimate.

2. Description of Related Art

In recent years the number of mobile computing devices has increased dramatically, creating the need for more advanced mobile and wireless services. Mobile email, walkie-talkie services, multi-player gaming, and call-following are examples of how new applications are emerging for mobile devices. In addition, users are beginning to demand/seek applications that not only utilize their current location but also share that location information with others. Parents wish to keep track of their children, supervisors need to track the locations of the company's delivery vehicles, and a business traveler looks to find the nearest pharmacy to pick up a prescription. All of these examples require an individual to know his own current location or the location of someone else. To date, we all rely on asking for directions, calling someone to ask their whereabouts, or having workers check-in from time to time to report their positions.

Location-based services are an emerging area of mobile applications that leverage the ability of new devices to calculate their current geographic positions and report them to a user or to a service. Examples of these services range from obtaining local weather, traffic updates, and driving directions to child trackers, buddy finders, and urban concierge services. These new location-sensitive devices rely on a variety of technologies that all use the same general concept. By measuring radio signals originating from known reference points, these devices can mathematically calculate the user's position relative to these reference points. Each of these approaches has its strengths and weaknesses depending upon the nature of the signals and measurements and the positioning algorithms employed.

Cellular-based positioning uses cell towers to determine the location of a mobile or user device. Cell towers are identified with a unique identifier in each cellular network in each country. Herein, the unique identifies of cell towers is referred to as cell ID. The cell IDs can be stored in a reference database, accessible by the mobile or user device. In the reference database, the cell ID can be used to link that cell ID to a previously determined location for the cell tower having that cell ID, where the location is also stored in the database. CPS can be based on received signal strength (RSS), time of arrival (ToA), or time difference of arrival (TDoA) from cell towers. Cellular-based positioning systems also can be based on the nearest neighbor technique, in which the entire service area is surveyed and a database of reception characteristics of points in the service area is constructed. The location of the survey points also can be logged, for example, by using a global positioning system (GPS). By comparing the reception characteristics of the mobile device with the surveyed points, the location of the mobile device can be determined. CPS can determine the position of a mobile device through several methods, including received signal strength and time of arrival.

CPS location determinations based on received signal strength use the received power of signals received from cell towers and triangulate the position of the mobile device based upon the received power values. The CPS based on received signal strength is not as accurate a system as compared to WLAN PS. The accuracy of the CPS systems using received signal strength is on the order of hundred meters, while the accuracy of WLAN PS is on the order of tens of meters.

CPS location determinations based on TOA measure the time that cellular radio wave travels to get to the mobile device from the cell tower and calculates the distance from the mobile device to the cell towers based on that time. If travel time of the cellular radio wave is measured correctly, the calculated distance from the cell towers can be accurate as WLAN PS, for example, up to ten meters. However, if the travel time is not measured correctly, the error in the location estimate can be higher than WLAN PS, for example, on the order of hundreds of meters up to a kilometer. The TOA method's accuracy depends on estimating the time of arrival of the cellular radio wave (as the name also indicates). In a normal operational environment of cellular network, the received signal is subject to multipath effect, which means the cellular receiver (of the mobile receiver) receives multiple copies of the transmitted signal reflected from the surroundings of the mobile device. These copies of the transmitted signal can arrive at slightly different times, and the selection of the signal which represents the distance between the mobile device and cell tower (or is the best estimate of distance) can be a challenge and an important part of the design of TOA based CPS. Further, there can be an option to consider all copies of the received signal and calculate distance based on all of them. In this case, there will be a set of distances (between the mobile device and cell tower) which will be passed to a trilateration module in the CPS (discussed herein). The trilateration module considers all the distance measurements from all the cell towers and finds the most likely location of the mobile device.

In the discussion herein, raw CPS measurements from a cell tower are generally intended to mean received signal strength (RSS) and/or times of arrival (TOAs) and/or time differences of arrival (TDOAs). References to cellular data are generally intended to mean the unique address of the cell tower (like cell ID), one or more record(s) of its, one or more power profile(s), and other attributes based on previous measurements of that cell tower. References to a CPS equation are intended to mean a mathematical equation relating the CPS measurements and data to the location of the mobile device.

WLAN-based positioning is a technology which uses WLAN access points to determine the location of mobile users. Metro-wide WLAN-based positioning systems have been explored by a several research labs. The most important research efforts in this area have been conducted by the PlaceLab (www.placelab.com, a project sponsored by Microsoft and Intel); the University of California, San Diego ActiveCampus project (ActiveCampus—Sustaining Educational Communities through Mobile Technology, technical report #CS2002-0714); and the MIT campus-wide location system. There is only one commercial metropolitan WLAN-based positioning system in the market at the time of this writing, and it is referred to herein as the WPS (WiFi positioning system) product of Skyhook Wireless, Inc. (www.skyhookwireless.com).

FIG. 1 depicts a conventional WLAN-based positioning system based on WiFi signals. The positioning system includes positioning software 103 that resides on a mobile or user device 101. Throughout a particular target geographical area, there are a plurality of fixed wireless access points 102 that transmit information using control/common channel signals. The device 101 monitors these transmissions. Each access point contains a unique hardware identifier known as a MAC address. The client positioning software 103 receives transmissions from the 802.11 access points in its range and calculates the geographic location of the computing device using the characteristics of the radio signals. Those characteristics include the MAC addresses, the unique identifiers of the 802.11 access points, the Time of Arrival (TOA) of the signals, and the signal strength at the client device 101. The client software 103 compares the observed 802.11 access points with those in its reference database 104 of access points. This reference database 104 may or may not reside in the device 101. The reference database 104 contains the calculated geographic locations and power profiles of all access points the system has collected. A power profile may be generated from a collection of measurements of the signal power or signal TOA at various locations. Using these known locations or power profiles, the client software 103 calculates the position of the user device 101 relative to the known positions of the access points 102 and determines the device's 101 absolute geographic coordinates in the form of latitude and longitude or latitude, longitude, and altitude. These readings then can be fed to location-based applications such as friend finders, local search web sites, fleet management systems, and an E911 service.

In the discussion herein, raw WLAN measurements from an access point are generally intended to mean received signal strength (RSS) and/or times of arrival (TOAs) and/or time differences of arrival (TDOAs). References to data are generally intended to mean the MAC address, one or more record(s) of it, one or more power profile(s), and other attributes based on previous measurements of that access point. References to a WLAN PS equation are intended to mean a mathematical equation relating the WLAN PS measurements and data to the location of the mobile device.

A WLAN-based positioning systems can be used indoors or outdoors. The only requirement is presence of WLAN access points in the vicinity of the user. The WLAN-based position systems can be leveraged using existing off-the-shelf WLAN cards without any modification other than to employ logic to estimate position.

FIG. 2 illustrates a conventional way of integrating WLAN PS and CPS, which consists of a WLAN PS 201 and a CPS 206 and a location combining logic 210.

WLAN PS 201 and CPS 206 are stand-alone systems, and each can operate independently of the other system. Thus, the result of each system can be calculated independent of the other system. The estimated location along with the expected error estimation of each system can be fed to the location combining logic 210. The expected error estimation is also referred to as HPE (horizontal positioning error) herein. The nominal rate of location update of CPS 206 and WLAN PS 201 is once a second. The location combining logic 210 combines the location estimates calculated in the same second by both systems.

WLAN PS 201 is a conventional system which estimates the location of a mobile device by using WLAN access points (WLAN AP). WLAN PS 201 can include a scanner of WLAN APs 202, a device to select WLAN APs 203, a trilateration module 204, and HPE estimation device 205.

WLAN scanner 202 detects WLAN APs surrounding the mobile device by detecting the received power (RSS, received signal strength) and/or time of arrival (TOA) of the signal. Different methods can be used to detect WLAN APs including active scanning, passive scanning, or combination of passive and active scanning.

The select WLAN APs device 203 selects the best set of WLAN APs to estimate location of the mobile device. For example, if ten WLAN APs are detected and one AP is located in Chicago and the others are located in Boston, without any other information, the Boston APs are selected. This is an indication that Chicago AP has been moved to Boston. In the conventional system, the best set of WLAN APs is selected based on geographical distribution of WLAN APs, in addition to corresponding parameters of WLAN APs, including received signal strength, signal to noise ratio, and the probability of being moved.

Trilateration module 204 uses WLAN APs and corresponding measurements and characteristics to estimate location of the mobile device. Received signal strength or TOA measurements from a WLAN AP are used to estimate distance of the mobile device to the WLAN AP. The aggregation of distance estimates from different WLAN APs with known location is used to calculate location of the mobile device. Trilateration 204 also can use a method which is called nearest neighbor, in which a location with a power profile similar or closest to the power reading of the mobile device is reported as the final location of the mobile device. The power profile of each WLAN AP or entire coverage area can be found in the calibration phase of the system by detailed survey of the coverage area.

HPE estimation device 205 is a module which estimates the expected error of the position estimate of the mobile device. The HPE or Horizontal Positioning Error is calculated based on previously scanned APs and their characteristics and also characteristics of the received signal as it was explained in co-pending Skyhook Wireless application Ser. No. 11/625,450 entitled "System and Method for Estimating Positioning Error Within a WLAN Based Positioning System," the entire disclosure of which is hereby incorporated by reference.

CPS system 206 can include a cellular scanner 207, trilateration device 208, and the CPS HPE estimation module 209.

The cellular scanner 207 receives signals from one or more cell towers in view of the device, decodes the received signals, and measures received signal strength (RSS) and/or time of arrival (TOA) and/or time difference of arrival (TDOA) of the signals based on the approach taken in the trilateration module 208.

The trilateration device 208 uses measurements from cell towers to estimate the location of the mobile device.

HPE estimation device 209 estimates the expected error of the estimated location. The HPE estimation device 209 is conventional and calculates expected error based on geometry of the cell towers and signal quality of the received signal from cell towers, for example C/N (carrier to noise ratio).

Location combining logic 210 receives simultaneous location estimates and HPE estimates from WLAN PS 201 and CPS 206. Simultaneous location estimations include estimations within one second of each other. The location combining logic 210 reports one estimated location by selecting one WLAN or CPS estimate or by linearly combining them. For example, location combining logic might select the WLAN PS 201 estimate. Otherwise, it may report the CPS estimated location, it might report the final location based on an expected error, or it might report a weighted average of the estimated locations by both systems according to the HPE.

SUMMARY

The disclosed subject matter generally relates to hybrid positioning systems and, more specifically, to methods of integrating wireless local area network (WLAN)-based positioning system (WLAN PS) and cellular-based positioning system (CPS) to improve accuracy of location estimates, increase availability of the positioning service to more users, and improve estimation of the expected error in a user's position estimate.

Embodiments provide systems and methods of integrating a WLAN-based positioning system (WLAN PS) and a cellular-based positioning system (CPS). An integrated system refers herein to a system that combines the information and measurements from both systems in order to increase the availability of the positioning service to more users to improve the accuracy of the positioning estimates, as compared to each individual system working independently. The integration can occur at different levels from a high-level combination of location estimation provided by both systems to the lowest level of integration of raw measurements from both systems and combining them to find the best estimate of the location of a user or a mobile device. The integration also includes using information from one system to assist the other system so as to increase the accuracy of the various estimates.

The disclosed subject matter relates to a method and system for increasing the accuracy of a WLAN based position estimate using cellular positioning information. In some embodiments, the method can include determining a set of possible WLAN location solutions for a WLAN and cellular enabled device based on one or more WLAN access points, obtaining cellular measurements from at least one cell tower, and determining the best WLAN location solution from the set of possible WLAN location solutions using the cellular measurements.

In some embodiments, the method can include using the cellular measurements from the at least one cell tower to provide a cellular based location estimate for the WLAN and cellular enabled device.

In some embodiments, the method can include determining the best WLAN location solution from the set of possible WLAN location solutions using the cellular based location estimate.

In some embodiments, determining the best WLAN location solution from the set of possible WLAN location solutions using the cellular based location estimate can include determining a distance between each of the possible WLAN location solutions and the cellular based location estimate, and selecting the best WLAN location solution based on which of the possible WLAN location solutions is within an expected error of the cellular based location estimate.

In some embodiments, determining the best WLAN location solution from the set of possible WLAN location solutions using the cellular based location estimate can include eliminating possible WLAN location solutions which are far from cellular based location estimate.

In some embodiments, the set of possible WLAN location solutions can include a WLAN access point cluster.

In some embodiments, the method can include weighing the WLAN access point cluster according to the distance from each WLAN location solution to the cellular based location estimate.

In some embodiments, the method can include selecting WLAN location solutions having a small distance to the cellular based location estimate. In some embodiments, the small distance is on the order of a hundred meters.

In some embodiments, the method includes eliminating WLAN location solutions having a large distance to the cellular location solution. In some embodiments, the large distance is on the order of tens of kilometers.

In some embodiments, each WLAN location solution in the set of possible WLAN location solutions can correspond to a location of a WLAN access point.

In some embodiments, the method can include comparing the location of each WLAN access point to the known location of the WLAN access point stored in a WLAN reference database, and if the location of the WLAN access point does not correspond to the known location of the WLAN access point in the WLAN reference database, determining that the WLAN access point has moved.

In some embodiments, the method can include updating the known location of the WLAN access point in the WLAN reference database to correspond to the location of the WLAN access point.

In some embodiments, the cellular measurements can include the cell ID of the cell tower.

In some embodiments, the method can include accessing a cellular reference database containing cell tower reference locations for each cell ID, comparing the cell tower reference location to the cellular based location estimate, and if the cell tower reference location and the cellular based location do not match, informing the cellular reference database that the locations do not match.

In some embodiments, the method can include updating the cellular reference database with the cellular based location.

In one aspect, the disclosed subject matter relates to a system for increasing the accuracy of a WLAN based position estimate using cellular positioning information. The system can include a positioning module having a WLAN module for receiving information from one or more WLAN access points and a cellular positioning module for obtaining cell tower information from at least one cell tower, logic located in the WLAN module to determine a set of possible WLAN location solutions for a WLAN and cellular enabled device based on one or more WLAN access points, and logic located in the positioning module to use the cell tower information to determine the best WLAN location solution from the set of possible WLAN location solutions using the cell tower information.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION OF THE INVENTION

Embodiments of the disclosed subject matter provide a method of integrating a WLAN-based positioning system (WLAN PS) and a cellular-based positioning system (CPS) to create a hybrid positioning system. An integrated or hybrid system refers to a system which inputs the measurements and location estimates from one system to another system before location estimate to improve the accuracy of the positioning and velocity and bearing estimates, and the accuracy of expected error estimate, as compared to each individual system working independently. The method of integrating a WLAN PS and CPS to create a hybrid positioning system can add CPS final estimates as another input to WLAN PS and WLAN PS final estimations as another input to CPS. In one embodiment, raw CPS measurements and raw WLAN PS measurements also can be integrated to select the best set of measurement to increase the accuracy of position estimate and HPE.

Figure 3:
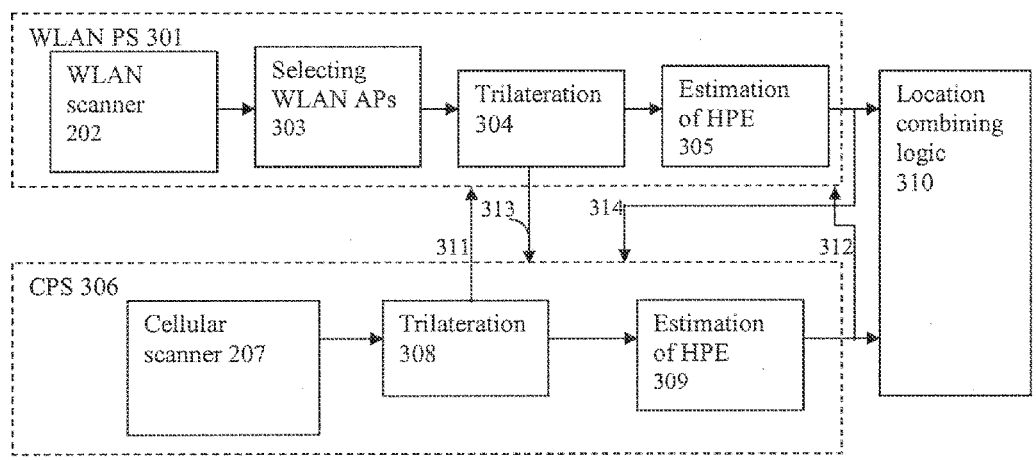
FIG. 3 illustrates a system for providing a WLAN PS and CPS integrated location solution, according to some embodiments of the disclosed subject matter.

FIG. 3 illustrates a block diagram of a hybrid system of a WLAN PS 301 and a CPS 306.

Figure 1:
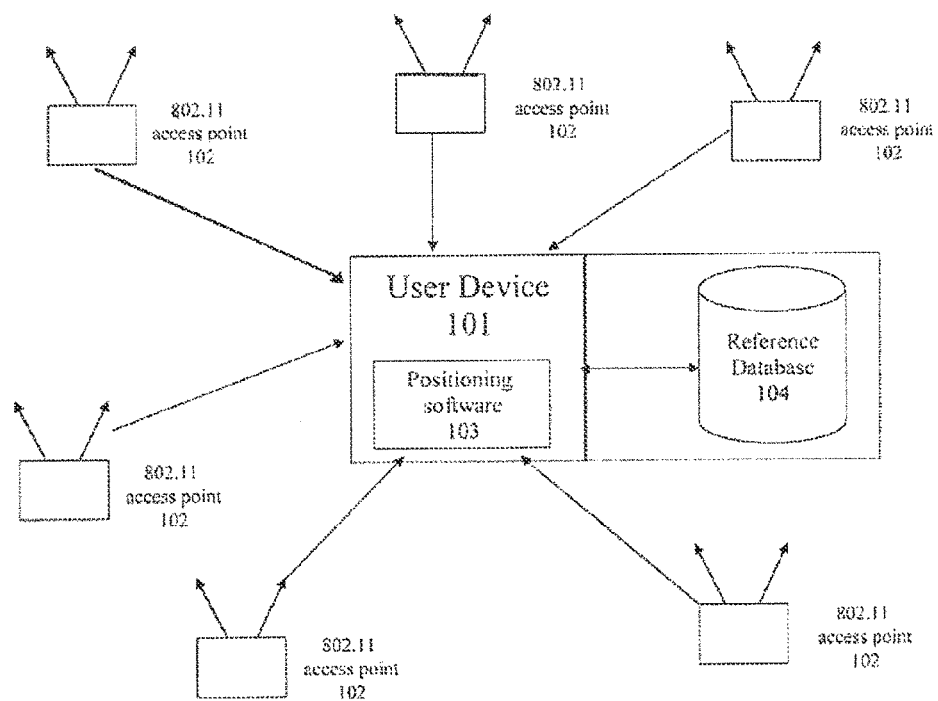
FIG. 1 illustrates a high-level architecture of a WLAN positioning system.
Figure 2:
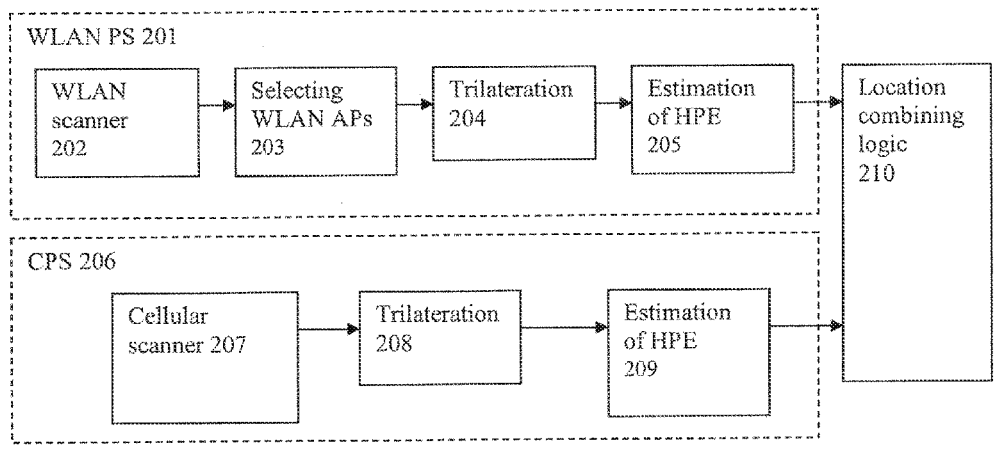
FIG. 2 illustrates a system for a conventional system for integrating WLAN PS and CPS.

The CPS 306 functions in a similar manner as the CPS 206 shown in FIG. 2 except that it is configured to receive a WLAN PS trilateration output 313 and a location estimation output 314 from the WLAN PS 301 and also to provide CPS trilateration 311 results to the WLAN PS. The integration of the WLAN PS trilateration and location estimation results with CPS 306 changes the design of CPS trilateration device 308 and HPE estimation device 309. A conventional CPS might need to be modified to provide the trilateration device's 308 results 311 outside of the CPS system.

This design change of CPS 306 after receiving WLAN PS information 313, 314 is discussed in more detail herein.

The WLAN PS 301 functions in a similar manner as the WLAN PS 201 shown in FIG. 2 except that it is configured to receive CPS trilateration output 311 and CPS location estimation 312 and to provide WLAN PS trilateration results 313. The integration of the CPS trilateration and location estimation results with the WLAN PS 301 changes the design of WLAN APs selection device 303, trilateration device 304, and HPE estimation device 305.

This design change of WLAN PS 301 after receiving CPS information 311 is discussed in more detail herein.

Under one embodiment, the disclosed method integrates a WLAN-based positioning system (WLAN PS) and a cellular positioning system (CPS) in which the WLAN PS provides a set of possible locations of a mobile device, and the CPS provides a location estimate of the mobile device. Among the possible WLAN PS location estimates, the WLAN location estimations which fit the CPS location estimate the best are selected as the final set of position estimates for the WLAN PS and CPS enabled mobile device.

In WLAN PS, the mobile device can detect one or more WLAN access points (WLAN APs), which can be used as reference points to locate the mobile device. The WLAN access points are generally randomly distributed and may move over time. Therefore, the WLAN positioning system applies a clustering algorithm to identify all the clusters of WLAN access points that are detected by the end user. Once the APs have been identified and grouped into clusters, the location of the device can be determined by using either each AP separately or by using the clusters of APs.

A cluster of WLAN access points is a set of WLAN access points where each access point is in the coverage area of each of the other access points. WLAN access points which are farther than a normal coverage of an access point from the cluster are considered to be part of a new cluster.

Once the APs have been identified and grouped into clusters, the location of each cluster of WLAN APs is estimated. The location of each cluster can be considered a possible location of the mobile device. Additionally, the CPS can provide a position estimate for the mobile device using cellular measurements from at least one cell tower. By combining WLAN PS and CPS position estimates, WLAN PS possible locations can be rejected if the distance from the WLAN PS possible locations to the CPS location estimate is an order of magnitude higher than accuracy of the CPS, where an exemplary accuracy of a CPS can be a few hundred meters. For example, if the distance between the CPS location estimate and a WLAN PS cluster is tens of kilometers, that cluster of WLAN APs can be rejected. In some embodiments, the location of individual APs, instead of clusters of APs, also can be examined against the CPS location estimate. For example, if two clusters of APs are pointing to Boston, one cluster of APs is pointing to Chicago and the CPS location estimate is in Boston, one of the APs pointing to Chicago or the cluster of APs pointing to Chicago can be examined against the CPS location estimate.

The final location can be calculated based on the remaining WLAN possible solutions, i.e., the remaining clusters of WLAN APs.

Figure 4A:
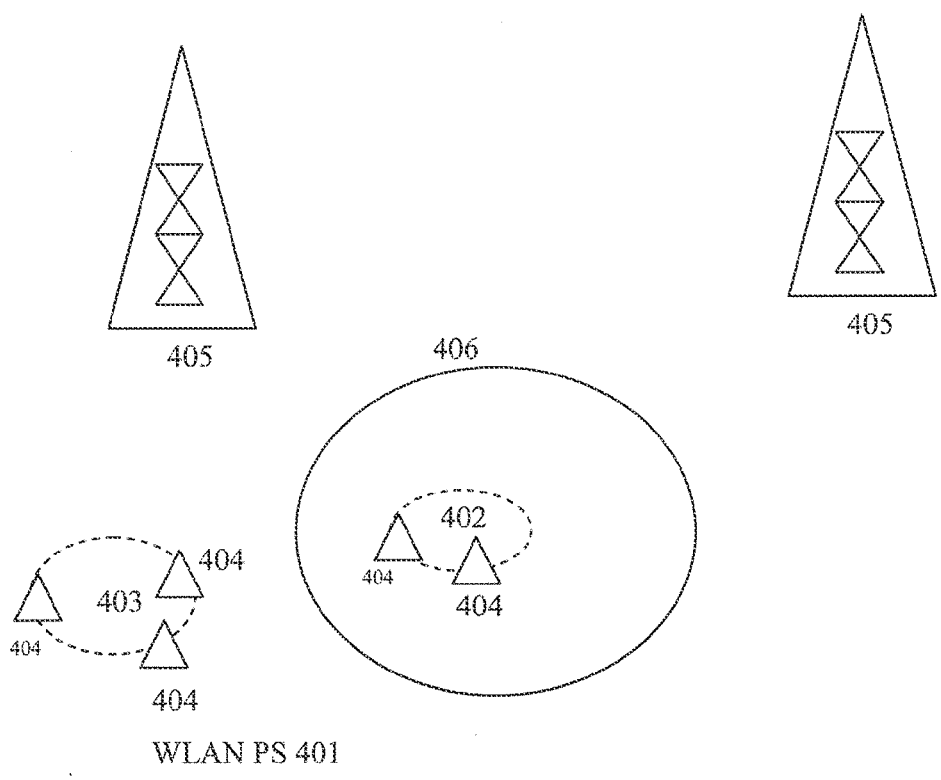
FIG. 4A illustrates an example of selecting a solution between possible WLAN PS solutions using a CPS location estimate, according to some embodiments of the disclosed subject matter.

For example, FIG. 4A shows a WLAN PS 401, which consists of five WLAN access points 404. The WLAN access points form two clusters in this example, a first cluster 402 and a second cluster 403. Each cluster can be used to estimate the location of the user device. CPS also detects two cell towers 405 and estimates a location for the mobile device 406.

If distance between possible solutions of the WLAN PS is on an order of magnitude higher than the coverage area of the detected cell towers in CPS, the location estimate or solution 406 of the CPS can be used to select or eliminate WLAN AP clusters.

In this example, let us assume that cluster 402 and 403 are pointing to different cities like Boston and Seattle. The CPS location estimate 406 is consistent with cluster 402, and cluster 403 is rejected. Therefore, cluster 402 is selected to calculate the user location. In some instances, cluster 403 can be assumed to be moved or relocated to Boston. Because we know that the user's location is in Boston, we can assume that the user's device cannot be detecting using an AP in Chicago. Therefore, the cluster 403 can be assumed to have been relocated to Boston; otherwise, the user in Boston would not be detecting that access point. Further, the locations of the WLAN APs are tracked in one or more reference databases to which the user device has access. The user device accessed the reference database to determine that the WLAN APs reference location is Chicago. Because the user device has determined that the WLAN AP or cluster of WLAN APs have moved, the user device can send a message to the reference database to update the database to reflect that the new location of that WLAN AP or cluster of APs is Boston. The reference database can then be updated to reflect that new location. (For more details on detecting moved access points, please see U.S. patent application Ser. No. 11/359,154, entitled "Continuous Data Optimization of Moved Access Points in Positioning Systems," filed Feb. 22, 2006, the entire contents are hereby incorporated by reference.) Therefore, cluster 403 WLAN APs can be identified as moved in the reference database, and their location is updated. Therefore, clusters of WLAN APs which are not referring to the same general location as the CPS estimated location can be considered to be incorrect. In other words, the associated location of WLAN APs of those clusters can be considered to be inaccurate or stale, that is, the WLAN AP may have moved.

Under some embodiments, the disclosed method integrates a WLAN-based positioning system (WLAN PS) and a cellular positioning system (CPS) in which the WLAN PS provides one location estimate of a mobile device, and the CPS provides one location estimate of the mobile device, and the consistency between the WLAN PS and the CPS location estimates is used to choose a WLAN PS location estimate. Note that there is only one location estimation reported by each WLAN PS and CPS.

Figure 4B:
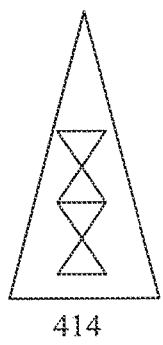
FIG. 4B illustrates an example of selecting a detecting moved access points/access point clusters or cell tower IDs, according to some embodiments of the disclosed subject matter.
Figure 4B:
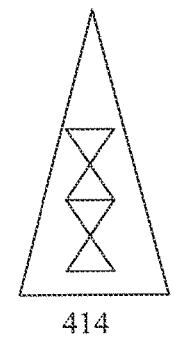
Figure 4B:
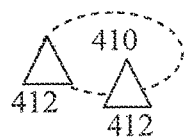
Figure 4B:
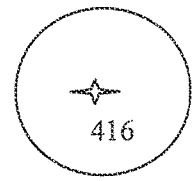

FIG. 4B illustrates an integrated solution of WLAN PS and CPS, in which WLAN PS 401 estimates a location 410 based on detected WLAN APs 412, which is far from CPS cell tower 414 location estimate 416. For example, if the WLAN PS locates the mobile device in Boston and the CPS locates the mobile device in Chicago, the discrepancy between WLAN PS and CPS location estimates indicate that either WLAN AP 412 has moved or CPS location estimate is not correct and the detected cell IDs have moved.

The WLAN PS can detect one or more WLAN APs. The WLAN PS extracts associated information about each detected WLAN AP from a reference database. The known WLAN APs (i.e., WLAN APs for which the reference database has location information) are used to locate the mobile device.

CPS also can detect one or more cell IDs of cell towers and extracts cell information for the detected cell IDs, for example, location and the coverage size of the cell tower associated with that cell ID. The detected cell IDs can be used to estimate the location of the mobile device. The estimated location by CPS can be used to verify the general location of the WLAN PS estimated location.

If the CPS and WLAN PS location estimates are pointing to the same general location (WLAN PS location estimate is within the expected accuracy of the CPS location estimate), the WLAN PS estimated location can be reported as final location of the mobile device. If the CPS and WLAN PS location estimates are pointing to locations that not in the same general location, this can indicate that the WLAN APs have moved or the associated location of the detected cell IDs are not correct.

Further, if a confidence of one of the location estimates reported by WLAN PS or CPS is high and it is higher than the other reported location, the estimated location with the highest level confidence is reported as the final estimated location of the mobile device. For example, if the latest locations of cell IDs are provided by the cellular carrier and most probably are correct, the confidence to the location associated to cell IDs is very high. Then, the location estimates WLAN system can be assumed to be incorrect. The discrepancy between the measurements can be reported back to the corresponding reference database. The WLAN AP or AP cluster locations can be updated in the corresponding reference database. If the confidence of either location is at the same level, then no location may be reported. This determination can be reported back to corresponding reference databases as an indication of possibility of WLAN AP movement and also a change of cell ID associated location information.

WLAN AP movement is estimated to occur more often than a change in the location of cell IDs. Therefore, in the case that WLAN PS and CPS location estimates are not consistent and distance between the estimated locations is an order of magnitude higher than the coverage of detected cell towers, the CPS location estimate is considered as the final location estimate of the mobile device, and it can be assumed that detected WLAN APs were moved to the new location.

If it is detected that a WLAN AP was moved, the new location in which the WLAN AP was detected can be used to correct and update location of the WLAN AP in the reference database.

Figure 5:
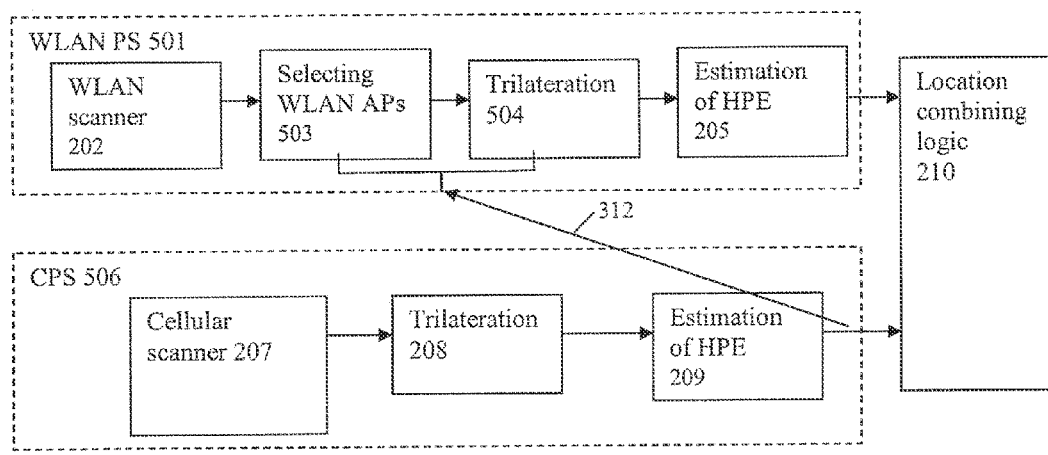
FIG. 5 illustrates a system for integrating a WLAN PS and a CPS in which a CPS location estimate is provided to the WLAN PS to select the best solution, according to some embodiments of the disclosed subject matter.

FIG. 5 illustrates block diagram of integrated solution of CPS and WLAN PS. CPS 506 can be a standard, off-the-shelf device as discussed in FIG. 2. The CPS location estimate result 312 is directed to selecting WLAN APs module 503 and trilateration device 504.

The WLAN APs selection devices 503 received the data from WLAN scanner 202 and the CPS location estimate as an input. The WLAN APs selection device 503 clusters WLAN APs based on the distance between the access points and it results in one or more cluster. The clusters are used in the trilateration device 504 to find possible location estimates of the mobile device. The WLAN PS location estimates based on clusters are selected or rejected based on the cluster distance from the CPS location estimate.

Under one embodiment, WLAN PS is used to detect and correct when the cell ID associated location is not correct and the cell ID has been re-assigned to a cell tower with a different location. Cell towers are subject to reconfiguration and change of their cell IDs. In a cellular network, cell towers less often physically move and are more often reconfigured and the cell IDs are re-assigned. However, cellular network reconfiguration happens rarely. When cellular networks are reconfigured, cell IDs may be re-assigned to another cell tower and the other cell tower may not be in the same area as the original cell tower. This can result in an incorrect location association for some cell IDs. If a mobile device detects a set of reconfigured cell towers that still refer to their old configuration with the old location of the towers, the mobile device may find that the detected cell towers are an order of magnitude farther away than the normal coverage of a cell tower. The normal coverage of a cell tower is between couple of hundred meters to couple of kilometers, but coverage of any particular cell tower can be estimated based on the density of cell towers or by site survey of the area. Therefore, using different cell towers can result to different location estimates. Thus, there are cases that the mobile device may detect one or more cell towers with cell IDs whose associated locations are not consistent with their recorded location in a reference database. In other words, the associated location of cell IDs point to different locations.

For example, if a mobile device detects five towers, two towers may point to Chicago and three others may point to Boston. In this case, the WLAN PS estimated location of the mobile device can be used to resolve the discrepancy between cell IDs and location. In the example, if WLAN PS location estimate is in Boston, it can be concluded that the cell IDs pointing to Boston are correct and cell IDs pointing to Chicago are not correct. Thus, the WLAN PS location estimate can be used to identify if the cell IDs are pointing to an incorrect location and therefore have been re-assigned to a different cell tower.

If cell ID movement is detected, the location of WLAN PS can be used as a reference to correct and update location of the cell IDs which are registered at an incorrect location in the reference database.

Figure 6:
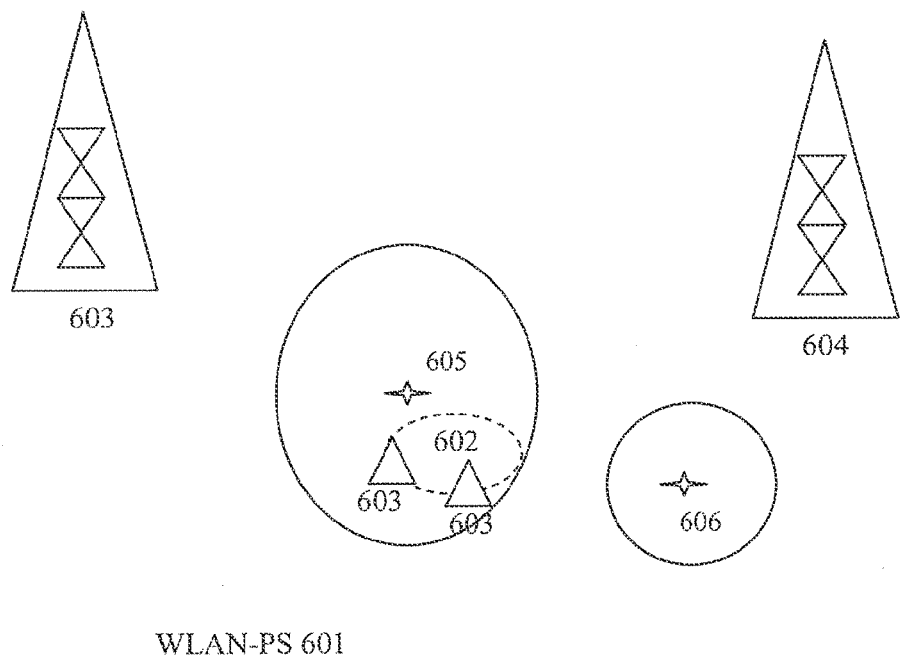
FIG. 6 illustrates an example of selecting a solution between possible CPS solutions based on a WLAN PS location estimate, according to some embodiments of the disclosed subject matter.

FIG. 6 shows CPS and WLAN PS, in which CPS results to two different location estimates 605 and 606 and a WLAN positioning system 601 with a location estimate 602. The detected cell towers 603 and 604 are far apart and resulting in two different location estimates 605 and 606. In this example, WLAN PS location estimate 602 is consistent with CPS location estimate 605. Therefore, it is concluded that the cell ID of the cell tower 604 was changed, and the cell ID of cell tower 604 is located in the vicinity of the cell tower 603 and WLAN PS location estimate 602.

Figure 7:
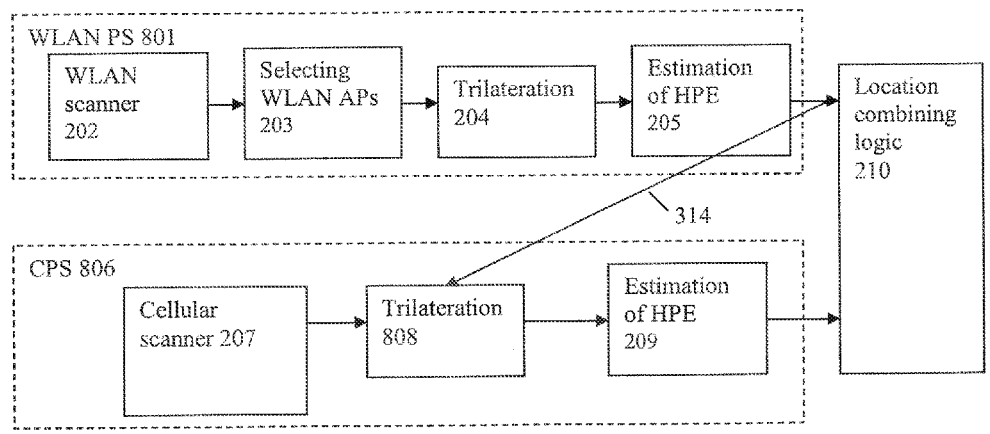
FIG. 7 illustrates a system for integrating a WLAN PS and a CPS and using a WLAN PS location estimate to select a CPS location estimate among possible CPS possible location estimates, according to some embodiments of the disclosed subject matter.

FIG. 7 illustrates WLAN PS 801 and CPS 806 integrated solution, in which all the modules are the same as FIG. 2, except for CPS trilateration 808. Trilateration based on cell towers 808 also receives WLAN PS location estimate 314 as an input. When CPS trilateration 808 provides multiple possible location estimates for the mobile device, the WLAN PS location estimate is used to detect cell towers having changed cell IDs and assigned to new locations.

Under another embodiment of the disclosed subject matter, a system and method is provided in which the WLAN PS can provide a region in which a possible location solution resides, and within the provided region the final location estimate of the mobile device can be selected based on CPS. This method can be used when the expected error of the CPS location estimate is less than the expected error of WLAN PS location estimate. For example, when CPS uses TOA or TDOA technology and there is a line of sight connection between the mobile device and the cell towers, the expected error of CPS can be less than that of WLAN PS. When CPS uses TOA and TDOA technology, the arrival time of received signal from each cell tower can be estimated. The received signal in cellular network can be subject to multipath, and there can be multiple copies of the received signal. Therefore, there can be multiple choices for the arrival time of the signal, which can result in different distance estimations between the mobile user and the cell tower. Thus, a set of distance measurements from two or more cell towers can result in multiple possible location estimates for the mobile device. CPS possible solutions are combined or selected by additional location information provided by WLAN PS about the location of the mobile device. For example, the CPS solution closest to the WLAN PS location solution can be selected as the final location estimate of the mobile device or possible solutions of CPS can be weighted according to their distance to the WLAN PS solution. After assigning a weight to each possible CPS location, various algorithms can be used to combine or select CPS possible locations. For example, the final reported location can be weighted by an average of all possible locations, low weight locations can be removed from the weighted average, or only the highest weighted location can be reported. Selection can be a special case of weighting, in which the respective weights are zero and one. A low weight can correspond to a CPS estimate that is far from the WLAN PS solution, for example, on the order of hundreds of meters. A high weight can correspond to a CPS estimate that is close to the WLAN PS solution, for example, within on the order of tens of meters.

Figure 8:
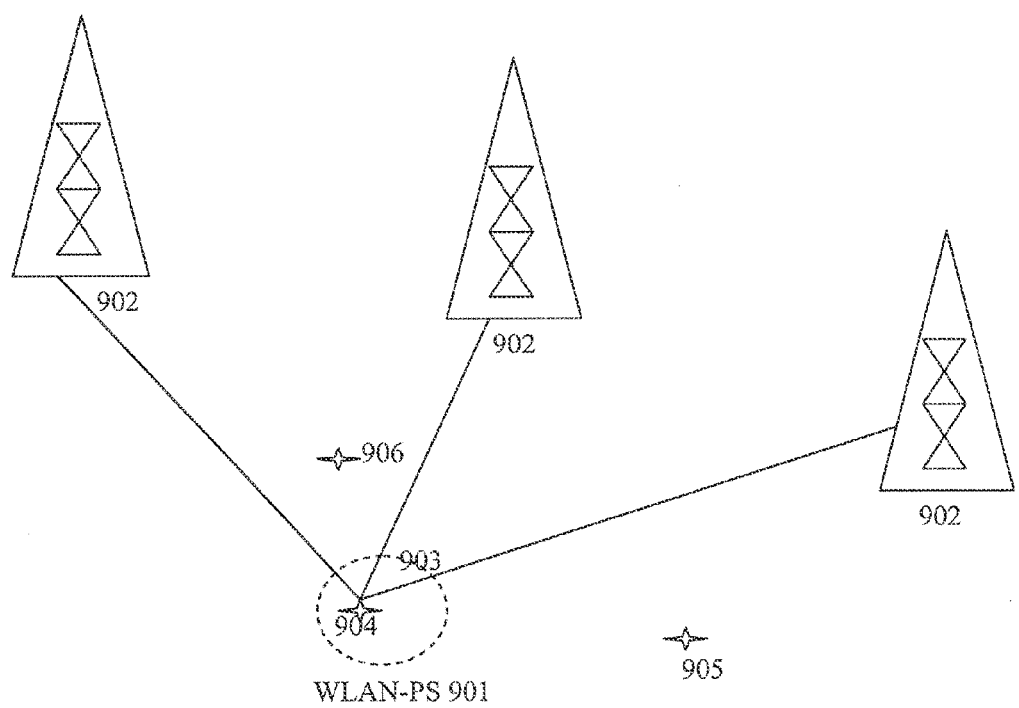
FIG. 8 illustrates a system for examining the location estimate and uncertainty provided by a WLAN PS against a CPS location measurements in order to find the best estimate of the location of a mobile device, according to some embodiments of the disclosed subject matter.

In some embodiments, there is only a measurement from one cell tower. Therefore, only the distance from one cell tower is known, which results to a circle of possible solutions of cell positioning system, and the cellular based position estimate (in the circle of possible CPS solutions) closest to the WLAN location estimate is selected as the location of the WLAN and cellular enabled device FIG. 8 shows an integrated WLAN PS and CPS, in which WLAN PS 901 provides an estimate of the location of the mobile device with some uncertainty 903. The uncertainty 903 can be the expected error of WLAN PS. The mobile device also acquires signals from two or more cell towers 902. CPS uses TOA in this example, and it returns a set of possible location estimates 904, 905, and 906. The location estimate 904 can be the final location estimate of the mobile device, because it is consistent with WLAN PS location estimate 903.

Referring back to FIG. 7, FIG. 7 shows an integrated solution of WLAN PS 801 and CPS 806 in which final location estimate 314 provided by WLAN PS is given to CPS trilateration device 808. However, in this embodiment, the CPS trilateration device 808 uses the WLAN PS location estimate 314 to select the best CPS location estimate instead of using the WLAN PS location estimate 314 to determine if the cell ID has moved.

WLAN PS 801 is an off the shelf system. The CPS 806 and trilateration device 808 can be modified to receive the WLAN PS location estimate 314 as an input. When the distance between associated locations of at least two detected cell IDs are an order of magnitude higher than normal coverage of the detected cell towers, the WLAN PS location estimate 314 can be used as an arbitrator to select cell IDs which are in the general area of the WLAN PS location estimate. Other cell IDs which are not in the general area of the WLAN PS location estimate can be marked as changed, i.e., the associated location of the cell tower was moved. Selecting the best set can mean selecting the one which is not moved. In other words, best set can be the set which has not moved.

Another embodiment of the invention provides a method to increase the accuracy of the expected error of a location estimate of an integrated location solution of CPS and WLAN PS and compare the integrated error to error location results for each individual system. The expected error estimation provides an uncertainty area around the estimated location. If the estimated locations of the WLAN PS and the CPS are within the uncertainty area of each other, i.e., the expected errors of the two systems are consistent, the uncertainty area of the final estimate can be reduced based on distance between estimated locations from both systems. If the estimated locations of WLAN PS and CPS are not within the uncertainty area of each other, i.e., the expected errors are inconsistent, the uncertainty area is increased based on distance between estimated locations from both systems. If only one of the estimated locations of WLAN PS and CPS falls inside the uncertainty area of the other system, the uncertainty area can be reduced or increased based on the quality of estimated error from each system. The estimated error of location estimate normally reports the 95% confidence interval, but it can report any other confidence interval as well.

Figure 9:
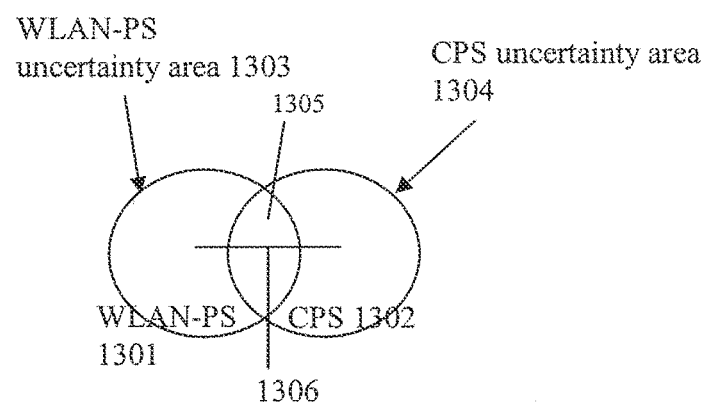
FIG. 9 illustrates an example for increasing the accuracy of an estimation of expected error by using CPS and WLAN PS information, according to some embodiments of the disclosed subject matter.

FIG. 9 illustrates WLAN PS location estimation 1301, WLAN PS expected error of estimation 1303, CPS location estimation 1302 and CPS expected error of estimation 1304. The reported uncertainty by each system can be the expected error of a final position estimate. The error of estimation also can be referred to as uncertainty area.

In such a system, the CPS and WLAN PS each can provide a location estimate and also an estimate of the expected error in that location estimation. The expected errors of the location estimate provided by both systems can be combined in order to provide a better estimate of the error of the location estimation. For example, if each system provides an area around the reported location as an uncertainty of the estimated location (1303 and 1304), the integrated system considers the overlap of the uncertainty areas 1305 and also the distance between estimated locations 1306 to estimate the uncertainty of the final location estimate. The greater the distance between the estimated locations by CPS and WLAN PS is, the higher the expected error of location estimation. In another implementation, the system can select the location estimate with the lowest uncertainty as the final location estimate.

Figure 10:
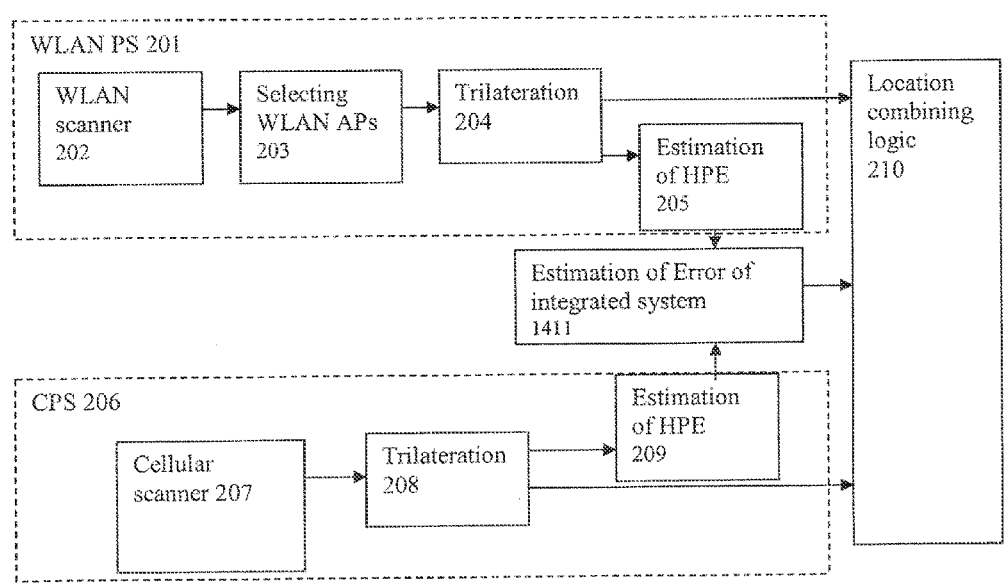
FIG. 10 illustrates a system for increasing the accuracy of an estimation of expected error by using CPS and WLAN PS information, according to some embodiments of the disclosed subject matter.

FIG. 10 illustrates a block diagram of integrated WLAN PS and CPS system, in which the expected error of each system is calculated using conventional methods, and the results are provided to integrated error estimation system device 1411. The integrated error estimation 1411 calculates the final expected error by considering the consistency between the reported locations by WLAN PS and CPS.

Upon review of the description and embodiments of the present invention, those skilled in the art will understand that modifications and equivalent substitutions may be performed in carrying out the invention without department from the essence of the invention. Thus, the invention is not meant to be limiting by the embodiments described explicitly above and is limited only by the claims which follow. Further, the features of the disclosed embodiments can be combined, rearranged, etc., within the scope of the invention to produce additional embodiments.

What is claimed is:

1. A method of increasing the accuracy of a resulting location estimate for a WLAN and cellular enabled device using cellular positioning information, the method comprising:
   identifying at least one wireless local area network (WLAN) access point (WLAN AP) in signal range of a WLAN and cellular enabled device based on wireless signals received by the WLAN and cellular enabled device transmitted by the at least one WLAN AP;
   retrieving an estimated location of the at least one WLAN AP stored in a reference database;
   determining a cellular-based location estimate for the WLAN and cellular enabled device based at least in part on cellular measurements received from at least one cell tower by the WLAN and cellular enabled device;
   comparing the cellular-based location estimate to the estimated location of the at least one WLAN AP retrieved from the reference database to determine whether a distance between the estimated location of the at least one WLAN AP and an estimated location of the at least one cell tower exceeds a pre-determined threshold;
   upon the condition that the distance between the estimated location of the at least one WLAN AP retrieved from the reference database and the estimated location of the at least one cell tower exceeds the pre-determined threshold, inferring that the estimated location of the at least one WLAN AP is inaccurate; and
   rejecting the at least one WLAN AP that is inferred to have an inaccurate estimated location when determining the resulting location estimate for the WLAN and cellular enabled device based at least on the cellular-based location estimate.

2. The method of claim 1, wherein the comparing the cellular-based location estimate to the estimated location of the at least one WLAN AP retrieved from the reference database comprises:
   determining a distance between the at least one WLAN AP and the cellular-based location estimate; and
   determining whether the estimated location of the at least one WLAN AP is within an expected error of the cellular-based location estimate.

3. The method of claim 1, further comprising,
   determining a WLAN-based location estimate for the WLAN and cellular enabled device based at least in part on the wireless signals received by the WLAN and cellular enabled device transmitted by the at least one WLAN AP; and
   upon the condition that the distance between the estimated location of the at least one WLAN AP retrieved from the reference database and the estimated location of the at least one cell tower is within the pre-determined threshold, determining the resulting location estimate for the WLAN and cellular enabled device from the cellular-based location estimate using the estimated location of the at least one WLAN AP.

4. The method of claim 3,
   wherein the at least one WLAN AP includes at least one WLAN access point cluster of a plurality of WLAN APs; and
   wherein the estimated location of the at least one WLAN AP stored in the reference database includes a plurality of estimated locations corresponding to an estimated location of a plurality of WLAN APs in the at least one WLAN access point cluster.

5. The method of claim 4, further comprising weighting the at least one WLAN access point cluster according to a distance from a plurality of estimated locations corresponding to the plurality of WLAN APs in the at least one WLAN access point cluster to the cellular-based location estimate for use in determining the resulting location estimate for the WLAN and cellular enabled device.

6. The method of claim 5, further comprising selecting estimated locations corresponding to the plurality of WLAN APs in the at least one WLAN access point cluster having a small distance to the cellular-based location estimate for use in determining the resulting location estimate for the WLAN and cellular enabled device.

7. The method of claim 6, wherein the small distance is on the order of a hundred meters.

8. The method of claim 1, wherein the pre-determined threshold is an order of magnitude greater than a coverage area of the at least one cell tower.

9. The method of claim 8, wherein the pre-determined threshold is on the order of tens of kilometers away from the estimated location of the at least one cell tower.

10. The method of claim 1, further comprising updating the estimated location of the at least one WLAN AP stored in the reference database to correspond to an updated location of the WLAN AP.

11. The method of claim 1, wherein the cellular measurements include a cell ID of the at least one cell tower.

12. A system for increasing the accuracy of a location estimate for a WLAN and cellular enabled device using cellular positioning information, the system comprising:
- a positioning module comprising:
  - a wireless local area network (WLAN) module for receiving wireless signals transmitted by at least one WLAN access point (WLAN AP);
  - a cellular positioning module for receiving cellular measurements from at least one cell tower; and
- logic located in the positioning module configured to
  - identify at least one WLAN AP in signal range of a WLAN and cellular enabled device based at least in part on the wireless signals;
  - retrieve an estimated location of the at least one WLAN AP stored in a reference database;
  - determine a cellular-based location estimate for the WLAN and cellular enabled device based at least in part on the cellular measurements;
  - compare the cellular-based location estimate to the estimated location of the at least one WLAN AP retrieved from the reference database to determine whether a distance between the estimated location of the at least one WLAN AP and an estimated location of the at least one cell tower exceeds a pre-determined threshold;
  - upon the condition that the distance between the estimated location of the at least one WLAN AP retrieved from the reference database and the estimated location of the at least one cell tower exceeds the pre-determined threshold, infer that the estimated location of the at least one WLAN AP is inaccurate; and
  - reject the at least one WLAN AP that is inferred to have an inaccurate estimated location when determining the resulting location estimate for the WLAN and cellular enabled device based at least on the cellular-based location estimate.

13. The system of claim 12, wherein the logic configured to compare the cellular-based location estimate to the estimated location of the at least one WLAN AP retrieved from the reference database comprises logic configured to
- determine a distance between the at least one WLAN AP and the cellular-based location estimate; and
- determine whether the estimated location of the at least one WLAN AP is within an expected error of the cellular-based location estimate.

14. The system of claim 12,
- wherein the at least one WLAN AP includes at least one WLAN access point cluster of a plurality of WLAN APs; and
- wherein the estimated location of the at least one WLAN AP stored in the reference database includes a plurality of estimated locations corresponding to an estimated location of a plurality of WLAN APs in the at least one WLAN access point cluster.

15. The system of claim 14, further comprising logic configured to weight the at least one WLAN access point cluster according to the distance from a plurality of estimated locations corresponding to the plurality of WLAN APs in the at least one WLAN access point cluster to the cellular-based location estimate for use in the logic configured to determine the resulting location estimate for the WLAN and cellular enabled device.

16. The system of claim 12, wherein the estimated location of the at least one WLAN AP retrieved from the reference database is inferred to be inaccurate if the estimated location of the at least one WLAN AP is an order of magnitude larger than the pre-defined threshold from the estimated location of the at least one cell tower.

17. The system of claim 12, further comprising logic configured to determine the resulting location estimate for the WLAN and cellular enabled device from cellular-based location estimate using the estimated location of the at least one WLAN AP retrieved from the reference database, upon the condition that the distance between the estimated location of the at least one WLAN AP retrieved from the reference database and the estimated location of the at least one cell tower is within the pre-determined threshold.

18. The system of claim 17,
- wherein the at least one WLAN AP includes at least one WLAN access point cluster of a plurality of WLAN APs; and
- wherein the estimated location of the at least one WLAN AP stored in the reference database includes a plurality of estimated locations corresponding to an estimated location of a plurality of WLAN APs in the at least one WLAN access point cluster.

19. The system of claim 18, further comprising logic configured to weight the at least one WLAN access point cluster according to a distance from a plurality of estimated locations corresponding to the plurality of WLAN APs in the at least one WLAN access point cluster to the cellular-based location estimate for use in the logic configured to determine the resulting location estimate for the WLAN and cellular enabled device.

20. The system of claim 19, further comprising logic configured to select estimated locations corresponding to the plurality of WLAN APs in the at least one WLAN access point cluster having a small distance to the cellular-based location estimate for use in the logic configured to determine the resulting location estimate for the WLAN and cellular enabled device.

* * * * *